US009788684B2

(12) United States Patent
Ferrier

(10) Patent No.: US 9,788,684 B2
(45) Date of Patent: Oct. 17, 2017

(54) DEVICE FOR PREPARING A BEVERAGE BY INFUSION POD WITH A PIVOTING CRADLE

(71) Applicant: TECHNOPOOL SARL, La Trinite (FR)

(72) Inventor: Christian Ferrier, Cantaron (FR)

(73) Assignee: TECHNOPOOL SARL, La Trinite (FR)

( * ) Notice: Subject to any disclaimer, the term of this patent is extended or adjusted under 35 U.S.C. 154(b) by 335 days.

(21) Appl. No.: 14/390,289

(22) PCT Filed: Mar. 8, 2013

(86) PCT No.: PCT/FR2013/050494
§ 371 (c)(1),
(2) Date: Oct. 2, 2014

(87) PCT Pub. No.: WO2013/150199
PCT Pub. Date: Oct. 10, 2013

(65) Prior Publication Data
US 2015/0050404 A1    Feb. 19, 2015

(30) Foreign Application Priority Data
Apr. 4, 2012  (FR) ..................... 12 53086

(51) Int. Cl.
*A47J 31/40* (2006.01)
*A47J 31/36* (2006.01)
*A23F 5/26* (2006.01)

(52) U.S. Cl.
CPC ............. *A47J 31/407* (2013.01); *A23F 5/262* (2013.01); *A47J 31/36* (2013.01); *A47J 31/3633* (2013.01); *A47J 31/3638* (2013.01)

(58) Field of Classification Search
CPC ...... A47J 31/36; A47J 31/407; A47J 31/3633; A47J 31/3638; A23F 5/262
See application file for complete search history.

(56) References Cited

U.S. PATENT DOCUMENTS

| 5,755,149 A | 5/1998 | Blanc et al. |
| 2006/0130665 A1* | 6/2006 | Jarisch ............... A47J 31/3638 99/279 |

(Continued)

FOREIGN PATENT DOCUMENTS

| EP | 1859714 B1 | 2/2009 |
| WO | WO03073897 | * 9/2003 |

(Continued)

OTHER PUBLICATIONS

International Search Report dated May 14, 2013, corresponding to International Patent Application PCT/FR2013/050494.

*Primary Examiner* — Anthony Weier
(74) *Attorney, Agent, or Firm* — Ladas & Parry LLP

(57) ABSTRACT

The present invention relates to a device for preparing an aromatized beverage capable of extracting aromas from a powder pod containing them, said device having:
a first part (1-1), and
a second part (1-2) of a same longitudinal axis (XX'), and first means for coaxial horizontal relative translation and/or rotation displacement (XX') of said first male part and second female part, and
a third part (4) delimiting an initial insertion compartment (6) and a discharge compartment (7) between said first and second parts in an open position with maximum separation, said third part having an orifice (4b), able to be crossed by at least one of both first and second parts, (Continued)

said third part being able to pivot in a synchronized way with a said relative translation and/or rotation of both first and second parts.

18 Claims, 12 Drawing Sheets

(56) References Cited

U.S. PATENT DOCUMENTS

| | | | |
|---|---|---|---|
| 2008/0041234 A1* | 2/2008 | Cortese | A47J 31/0673 99/290 |
| 2008/0250936 A1* | 10/2008 | Cortese | A47J 31/0668 99/295 |
| 2010/0011965 A1* | 1/2010 | Turi | A47J 31/369 99/289 R |
| 2014/0150666 A1* | 6/2014 | Fin | A47J 31/3633 99/295 |
| 2015/0297019 A1* | 10/2015 | Ferrier | A47J 31/3633 99/295 |

FOREIGN PATENT DOCUMENTS

| | | | |
|---|---|---|---|
| WO | 2006013124 A1 | | 2/2006 |
| WO | WO2008/012316 | * | 1/2008 |

* cited by examiner

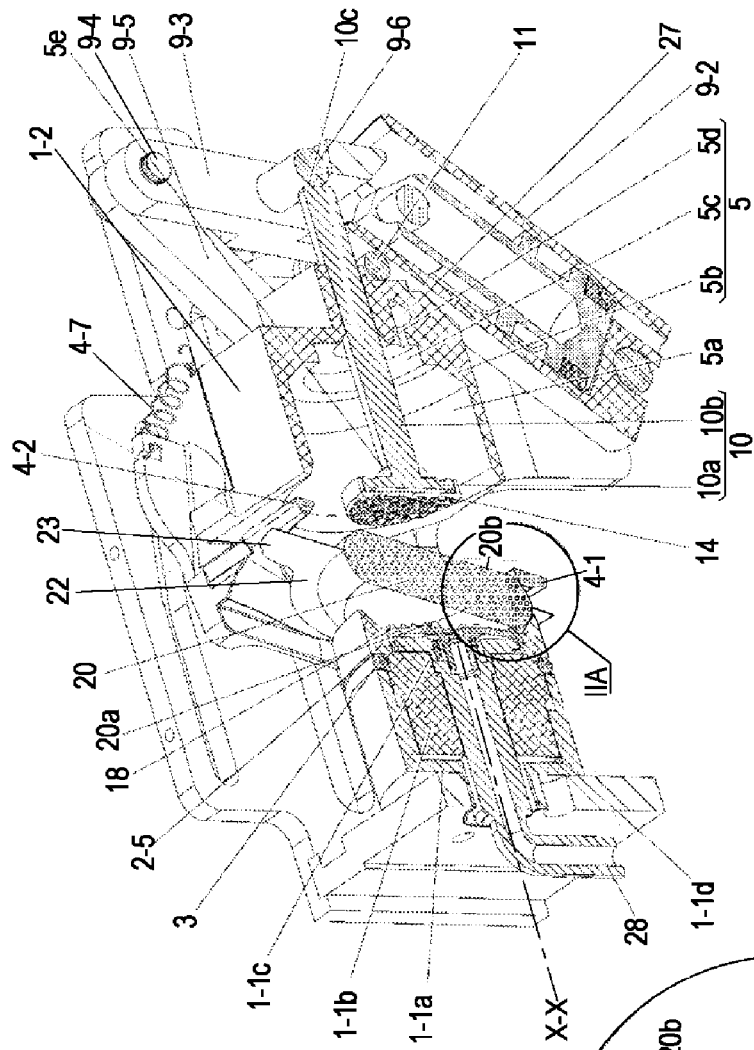
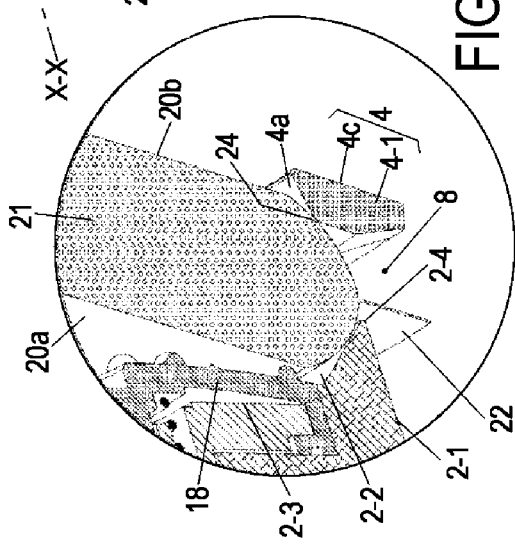
FIG.2
FIG.2A

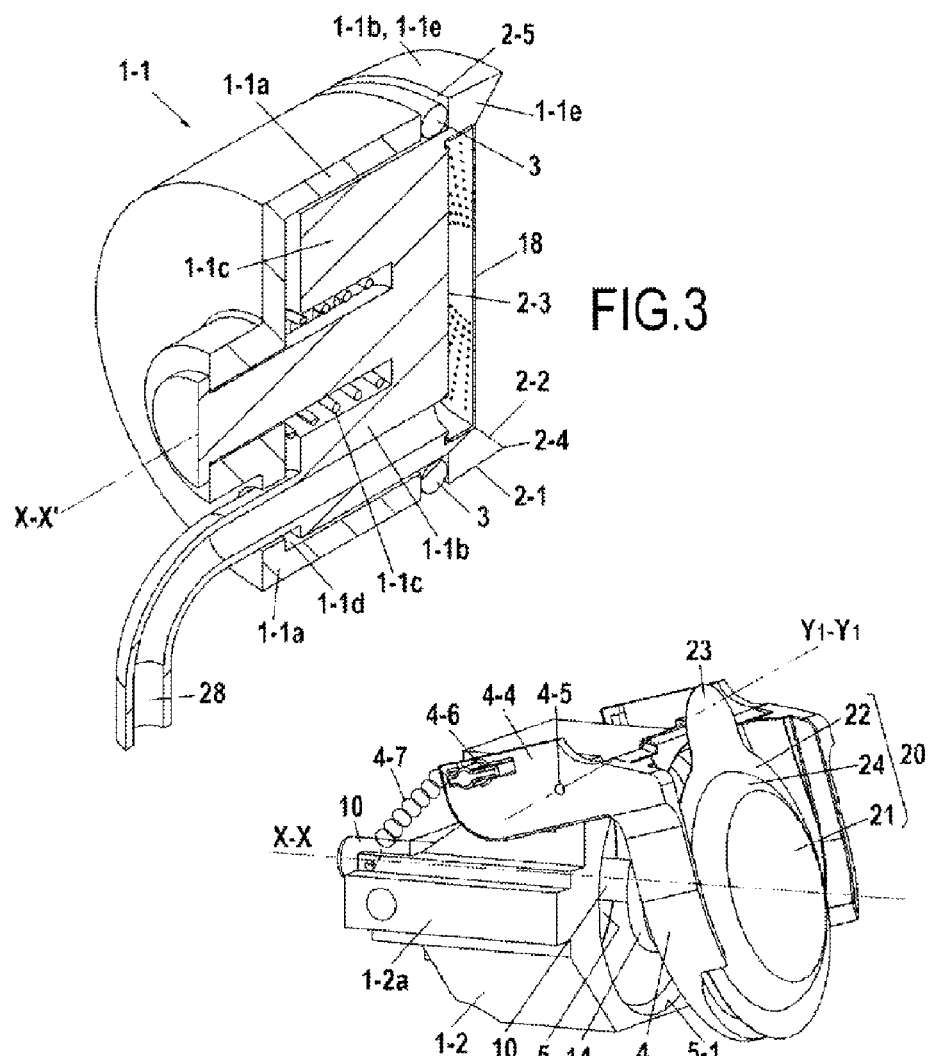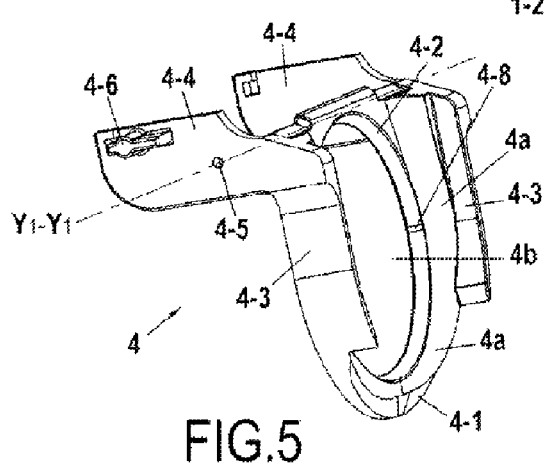

Figure 1:
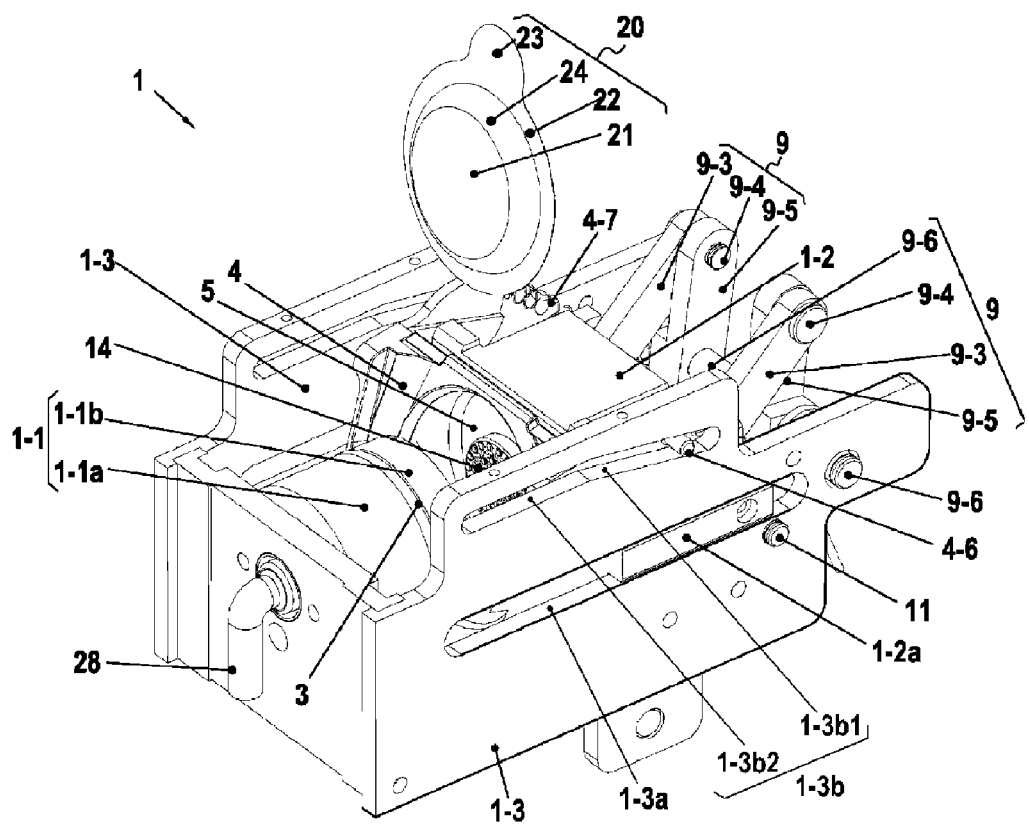

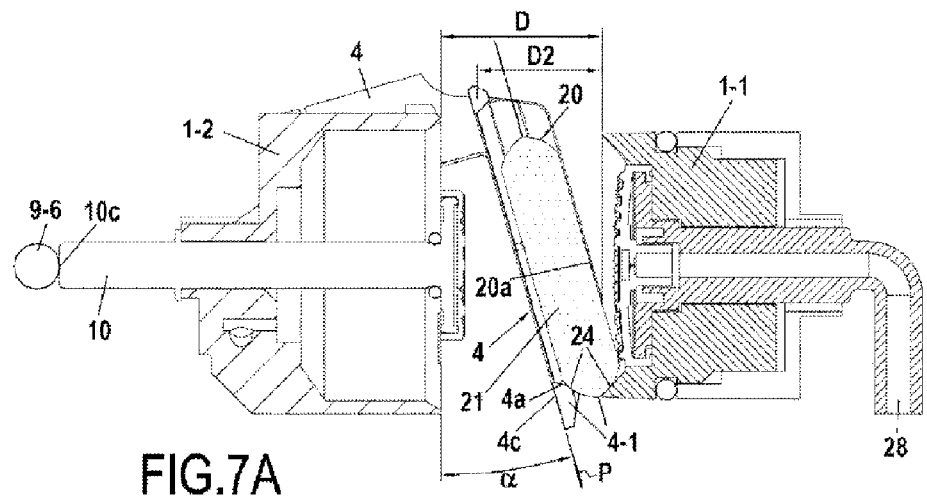
FIG.7A
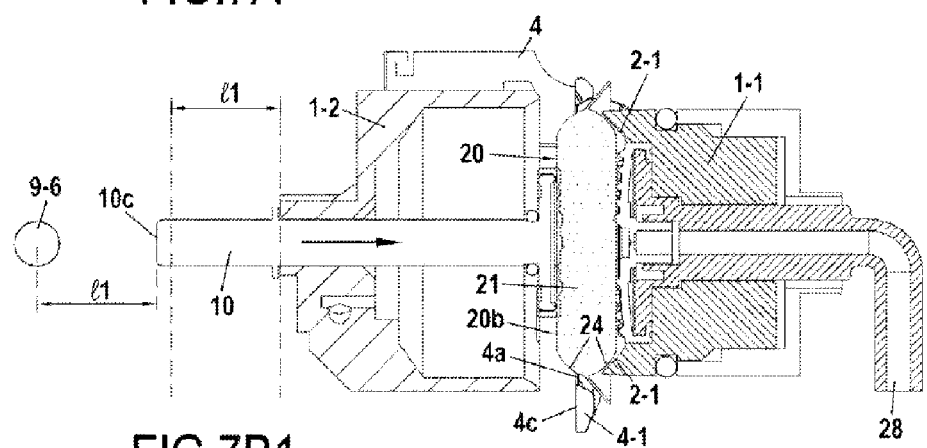
FIG.7B1
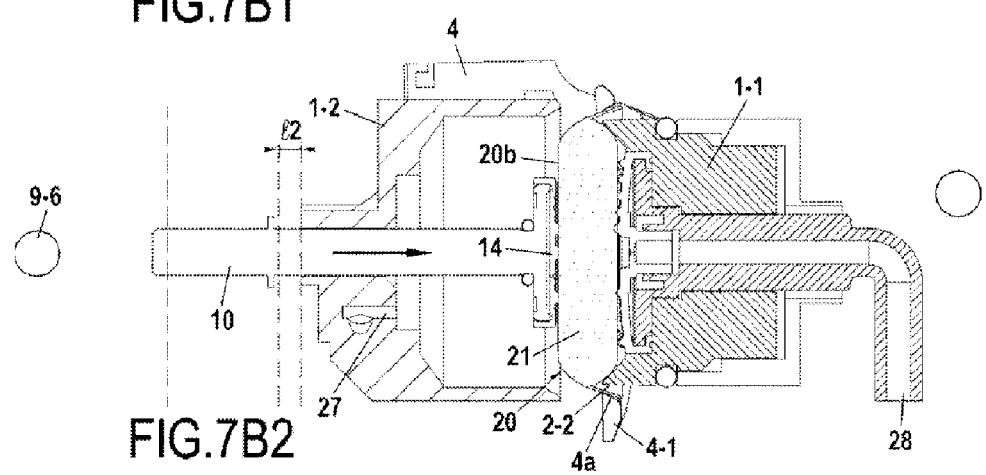
FIG.7B2

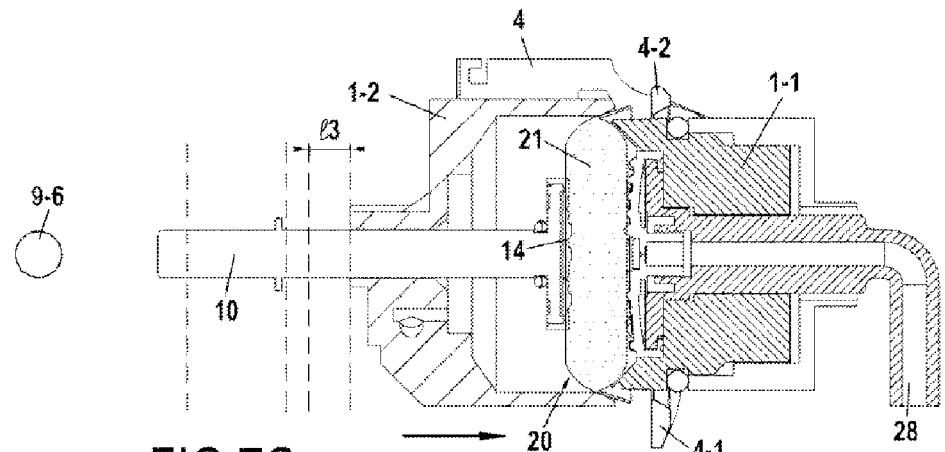
FIG.7C
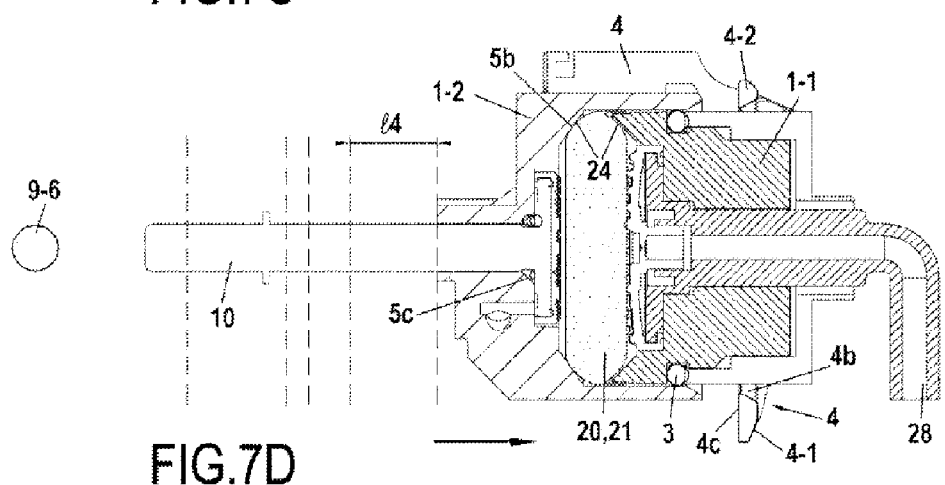
FIG.7D
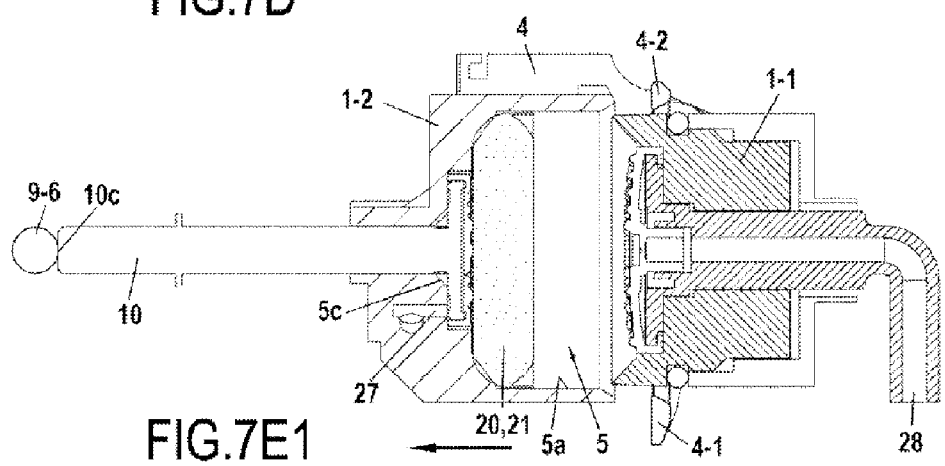
FIG.7E1

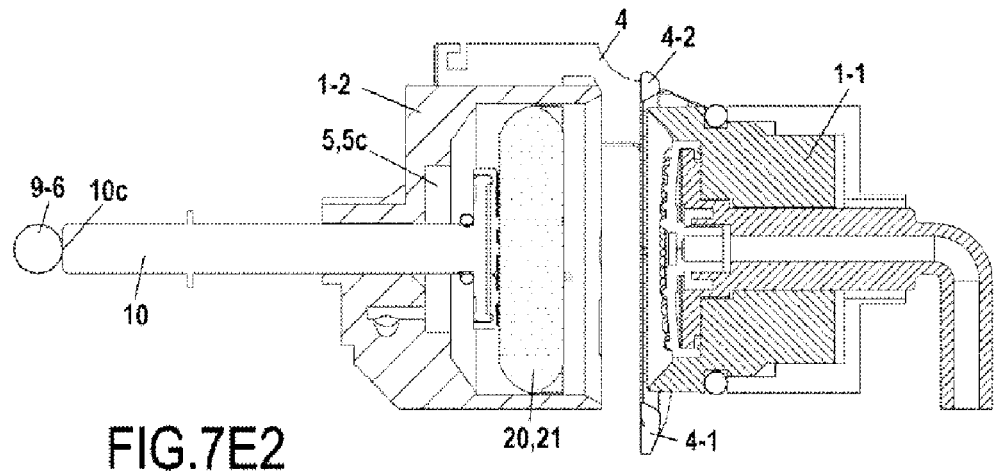
FIG.7E2
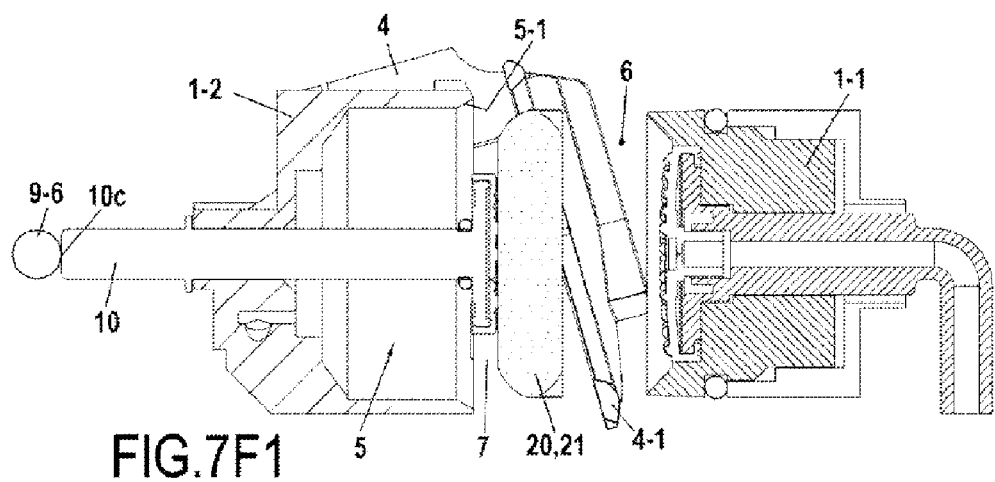
FIG.7F1
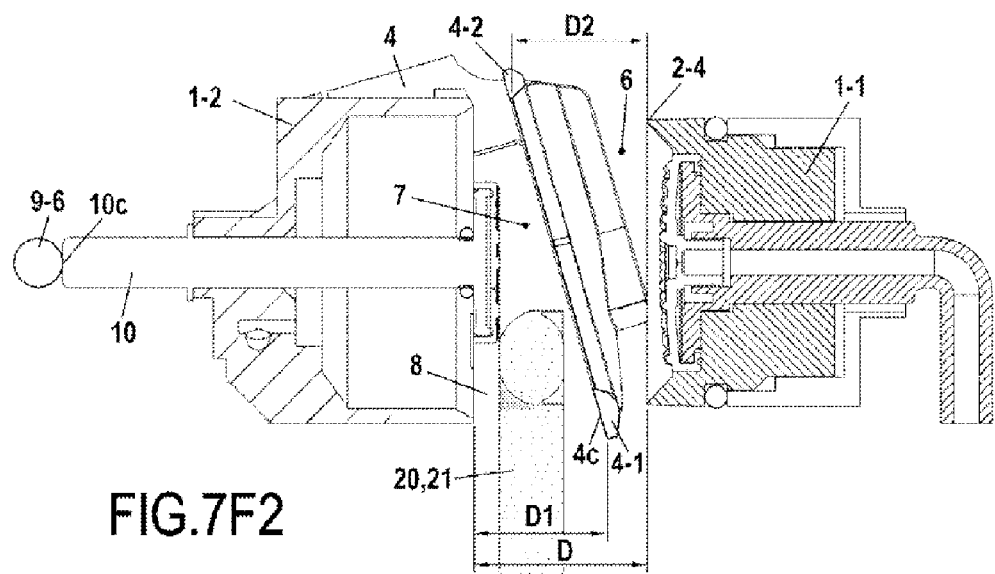
FIG.7F2

DEVICE FOR PREPARING A BEVERAGE BY INFUSION POD WITH A PIVOTING CRADLE

This application is a 371 of PCT/FR2013/050494, filed on Mar. 8, 2013, which claims priority to French Application No. 1253086, filed Apr. 4, 2012.

The present invention relates to a device for preparing a beverage for infusion of a powder pod containing aromas to be extracted through which a liquid is injected, preferably water.

More particularly, the present invention relates to a device of this type adapted for a pod having the shape of a flat or ovoidal pastille, said pastille being surrounded by a peripheral flat flange with an essentially circular circumference extending in an axial plane with an essentially circular section of said pod.

By "flat" or "ovoidal" it is meant that the pod in a perpendicular section to said axial plane with circular section, has two symmetrical faces with a flat or lenticular portion on either side of said axial plane.

In a known way, said pod consists of two half-covers forming two half-shells joined together at their periphery in order to form said flange, said flange radially extending said cover and preferably made with the same material, radially, as the remainder of said cover.

More particularly, the present invention relates to a device for preparing a beverage from powder pods containing aromas, preferably a compacted powder, said pod comprising a cover, preferably in a porous or microperforated flexible material, preferably of the paper filter type, filled with said powder.

This type of pod is essentially used in additional filter-holder coffee machines in which the pod is placed flat manually, horizontally, in a pod holder requiring the pod to be removed manually after use. Pods and devices of this type are notably described in FR 2 424 726.

Semi-automatic machines are known in which the ejection of the pod is accomplished without manual intervention of the user because, the pod inter alia is introduced into the machine in the vertical direction allowing its ejection by gravity.

However, in the machines described in the prior art, notably in EP 1 859 714, it is necessary to apply a pod with a rigidified flange, notably a cardboard flange, but more generally a pod, the cover of which is relatively rigid requiring that said cover be pierced in order to be able to extract the aromas contained inside the pod by injecting liquid through the pod.

More particularly, in EP 1 859 714, the device comprises:
a first part forming a piston, and
a second part comprising at its end an extraction and discharge compartment open in the lower portion, adjacent to an insertion compartment open in the upper portion and able to retain the pod with its low portion, and
means for coaxial horizontal relative translational displacement of said first and second parts, such that said first part passes through a side aperture on the front face of the insertion compartment and transfers the pod into the adjacent extraction and discharge compartment. During this transfer between both compartments, the pod is retained by pins on the surface of the piston piercing through its cover wall. Next, once it is in the adjacent extraction compartment, the pod is retained by clamping its flange between the first part and a peripheral side edge of the extraction and discharge compartment forming the front face of the second part. It is the clamping of the flange which ensures the seal between both first and second parts in an extraction chamber confining the extraction and discharge compartment into which the liquid is injected through the pod, the wall of which has been pierced by said pins.

The device described in EP 1 859 714 is not however suitable for application when the cover and the flange of the pod are made in paper for the following reasons:

In the EP 1 859 714 device, the flange has to have some flexibility in order to fold during its passing from the insertion compartment to the discharge compartment, in order to then resume its initial vertical straight shape once it is in the discharge compartment, so that the flange may be properly clamped in order to achieve the seal of the extraction chamber as described above.

Further, the flange and the wall of the pod should have some strength so as not to be torn and to prevent the fall of the pod when its flange is clamped, in spite of the weight of the pod, when the latter is not retained in the low portion as this is the case in the discharge compartment.

Finally, if the pod is not retained by piercing elements of its wall during its transfer between both compartments, it is not prevented from falling by gravity when it arrives in the discharge compartment before the final clamping of the flange in the discharge compartment.

Such mechanical properties are not necessarily satisfied with a porous paper flange with low paper weight, such as 12 to 50 g/m$^2$ as this is the case in traditional paper pods permeable to the liquid.

In practice, EP 1 859 714 is specially suitable for pods with rigid capsules, the wall of which should be pierced on the one hand and the flange of which at least has some rigidity in order to rapidly resume its position after folding, once the folding stress has ended, on the other hand and for supporting clamping without causing any tear once it is in the discharge compartment.

In U.S. Pat. No. 5,776,527, a device is also described capable of receiving a pod vertically and of allowing its semi-automatic ejection by gravity without manual intervention of the user. However, in such a case, the pod is maintained vertical between two elements forming grooves. These elements are positioned laterally on each side of the pod and slightly tilted so that they retain and support the flange of the pod. And, by lateral pivoting of both elements around an axis parallel to the longitudinal axis common to both parts, it is possible to release and eject by gravity the pod after extracting the aromas which it contains. However, additional means for pivoting the retention elements of the pods have to be applied. Additionally, in U.S. Pat. No. 5,776,527, there again, the sealing of the extraction chamber requires clamping of the flange over the whole of its periphery. This device thus requires the application of a pod with at least one relatively rigid flange, i.e. in practice a cardboard flange, further, as the device of U.S. Pat. No. 5,776,527 does not comprise any internal ejector, the flange may remain stuck in the device if the cardboard making it up has excessively softened, thereby perturbing the discharge of the pod.

Still other machines are known capable of sealing a pod in a vertical position applying systems for discharging the pod by pivoting its insertion compartment as described in EP 1 219 217.

Such a machine is complex and costly to make insofar that the sole translation means applied for compressing and confining the pod in an extraction chamber are insufficient for allowing ejection of the pod after extraction, the application of additional oscillatory means being required.

In WO 2010/149468, a device for preparing a flavored beverage, notably based on coffee aromas, capable of extracting aromas by infusion of a powder pod containing them is described, said pod having a flat or ovoidal pastille shape, filled with said powder, said pastille being surrounded by a flat peripheral flange extending in an axial plane of said pastille. Said device comprising:

- a first male part comprising at least one cylindrical part forming a piston, and
- a second female part comprising a body delimiting an internal chamber with a cylindrical wall of a same longitudinal axis (XX') as said piston, said second female part comprising, in front of said internal cylindrical chamber, an insertion compartment forming a cradle capable of receiving said pod with its flange in a position parallel to the plane of the front aperture of said chamber, and
- first means for coaxial horizontal relative rotation and relative translation displacement XX' of said first male part and second female part, the assembly of said second part and of said cradle being initially tilted upwards, before pivoting downwards and then being displaced in translation relatively to said first male part passing through the side aperture of said cradle in order to compress said pod at the bottom of said chamber in order to obtain a sealed closing position in which said cylindrical portion of said first male part is located inside said internal chamber, delimiting a sealed compartment, called an extraction chamber, inside said internal chamber, in which said pastille is capable of being compressed.

This device requires means for pivoting the assembly of the second female part and of said cradle.

On the other hand in WO 2010/149468, the bottom of the cradle for storing the pod is partly recessed in the portion supporting the low portion of the flange, and the cradle only retains the flange locally in two points, by symmetrically positioned retention means 33, and not on its lower periphery. The result of this is that in the device according to WO 2010/149468, the pod is not always perfectly maintained in a coaxial position relatively to the cylinder and to the piston, notably when the flange of the pod collapses and/or when the diameter of the flange varies from one dose to another. Indeed, in both of these cases, there may be an axial misalignment of the pod relatively to the coaxial axis of the piston and of the cylinder.

In WO 2010/149468, the bottom of the throat of the cradle supports the peripheral border of the flange on its lower half-circumference, which does not give the possibility of avoiding collapse of the flange in its insertion compartment because of its flexibility, and therefore does not maintain it in a centered suitable position relatively to the axis of said first male part and second female part, so that the folded flange does not properly enter its housing between the piston and the chamber in the closing position.

More specifically, when the diameter of the flange is slightly greater than the one initially intended in the configuration of the cradle, slight axial misalignment of the pod occurs relatively to the axis of the cylinder and of the piston, so that jammings may occur, either initially during the compression, or during the ejection.

In patent WO 2010/149468, this problem is enhanced because the cradle does not include a solid lower bottom.

The object of the present invention consists in a simpler improved device, in which the pod is introduced vertically and in which the operation for ejecting the pod does not require any other mechanical means in motion other than the application of relative translation means for the two parts allowing compression of the pod in a sealed extraction chamber.

Another object of the present invention is to provide a device of this type which is particularly suitable for being applied with pods for which the flange and the wall of the cover are made in a porous or micro-perforated flexible material, with low base weight, notably from 12 to 50 g/m$^2$, preferably of the paper filter type.

To do this, the present invention provides a device for preparing a flavored beverage, notably based on coffee aromas, capable of extracting aromas by infusion of a powder pod containing them, preferably a compacted powder, said pod comprising a cover, preferably in a porous or micro-perforated flexible material, preferably of the paper filter type, said pod having a flat or ovoidal pastille shape, filled with said powder, said device being capable of extracting the aromas contained in said powder when said pod is crossed by a liquid, preferably pressurized water, in an extraction chamber, said device comprising:

a first part and a second part with a same longitudinal axis XX', and means for coaxial horizontal relative translation and/or rotation displacement XX' of said first part and said second part between:
- an initial opening position or of maximum separation in translation and/or rotation of both first and second parts between which is found a third part delimiting an initial insertion compartment capable of receiving the said pod, the latter may be inserted by gravity into said insertion compartment open in the upper portion,
- a closing position or of minimum separation in relative translation and/or rotation of both first and second parts in which said first and second parts delimit a sealed compartment, called an extraction chamber, inside of which said pastille is capable of being compressed in order to produce said extraction, said third part comprising an orifice, preferably partly at least circular, capable of being crossed by at least one of both first and second parts, and
- a final open position or of maximum separation in translation and/or rotation of both first and second parts between which said third part delimits a discharge compartment able to receive said pod after said extraction, said pod may be discharged by gravity outside said discharge compartment open in the lower portion, characterized in that said third part is pivotally mounted relatively to a transverse axis YY' perpendicular to said longitudinal axis XX', able to pivot in synchronization with said relative translation and/or rotation of both first and second parts, such that:
- the plane of said orifice is in a vertical position and crossed by a said first or second part when said first and second parts are in said closing position, and
- the plane of said orifice is in a position of maximum tilt, preferably by an angle á from 10 to 30°, relatively to the transverse vertical plane perpendicular to said longitudinal axis XX' when said first and second parts are in said initial or final open positions, and
- said third part has a cradle shape such that in a tilted position, in said initial and final open positions, it forms:

a said insertion compartment with the front face of a said first part or a said second part, and respectively a said discharge compartment with a front face of a said second part or respectively a said first part, and said orifice of said third part comprises a front peripheral surface, able to support at least in its lower portion, a convex rounded peripheral portion of the pastille filled with powder of said pod in a tilted position in said insertion compartment, the other face of a peripherally convex rounded pod of the solid pastille-shaped portion of said pod in a tilted position in said insertion compartment bearing against a lower portion of the front face of a said first or, respectively, second part.

According to the present invention, said third part does not form by itself alone a said insertion compartment, like in the prior art. But, it is the cooperation of said third part and of the front face of said first or second part which forms a said insertion compartment. On the other hand, the lower portion of said third part does not retain the pod if necessary at the peripheral edge of its flange but in a sub-face of its pastille-shaped portion filled with powder, which guarantees better coaxiality of the pod insofar that said pastille is of a more constant and more rigid size than said flange.

By "front" or "rear" of the first part and optionally of the elements which are secured to it such as said cradle, are meant relative positions in the axial longitudinal direction XX', "front" meaning closer to the second female part and "rear" meaning further away from the second female part, the front face of the first male part being the foremost.

Conversely, by "front" or "rear" of the second female part (and optionally elements which are secured to it such as said cradle) are meant relative positions in the axial longitudinal direction XX', "front" meaning closer to the first male part and "rear" meaning further away from the first male part, the insertion compartment being located in the front of said second female part.

More particularly according to the present invention, said third part has an identical tilt in the insertion position of the pod and the discharge or ejection position of the pod, and the rotation of said third part is accomplished automatically concomitantly with the relative translational displacement of said first and second parts.

Still more particularly, the rotation of said third part comprises a rotation step between the tilted position in said initial insertion position and a vertical position in which the orifice of said third part is crossed by said first or second part after having been crossed by said solid pastille-shaped portion of said pod.

It is understood that said insertion compartment has in its upper portion, an aperture with a width greater than the width of the pod in order to allow insertion of the pod into said insertion compartment. And, the discharge compartment has in its lower portion, an aperture with a width greater than the width of the pod in order to allow discharge of the pod in said discharge compartment.

Said third part may be mounted on a common chassis supporting the three parts or being secured to one of both first and second parts.

Preferably, for infusion of a said pod comprising a said pastille surrounded by a peripheral flat flange extending in an axial plane of said pastille and capable of folding relatively to said axial plane, said pod preferably has an essentially circular section in said axial plane, the device according to the invention is characterized in that the said flange is inserted between the lower portion of said third part and the lower portion of the front face of said closest first part or respectively second part forming said insertion compartment.

It is understood that said insertion compartment has in its lower portion, a lower aperture of a smaller width in said axial longitudinal axis XX' than the width of said pastille into which said flange is inserted without being folded so that the pod remains in said insertion compartment, in a said tilted position of the cradle.

In a preferred embodiment, said device includes:

a—a said first male part comprising at least one cylindrical portion forming a piston, and b—a said second female part comprising a body delimiting an internal chamber with a cylindrical wall of the same longitudinal axis XX' as said piston, and c—a said third part pivotally mounted on a common chassis supporting the three parts or secured to at least one of both first and second parts, and d—means for coaxial horizontal relative translational displacement of said first male part and second female part capable of allowing a said translation between:

i—a said sealed closing position in which said cylindrical portion of said first male part is located inside said internal chamber, delimiting a sealed compartment, called an extraction chamber, inside said internal chamber, the orifice of said third part in said vertical position being crossed by at least said first part in said closing position, and ii—a said maximum opening position in which:

the front face of said first male part is separated by a maximum distance from a front surface of the aperture of said chamber of said first female part, and said third part in a tilted position forms a cradle, said orifice of which is delimited on its upper face by a front surface, preferably a front frusto-conical surface at least in its lower portion, said front surface of said cradle delimiting a said insertion compartment with the front face of said first male part, said orifice being delimited on its lower face by a rear face of said cradle, preferably a planar rear surface of said cradle, delimiting a said discharge compartment with the front surface of the aperture of said chamber of said first female part, and said front surface of said cradle at least in its lower portion is capable of supporting a face of the pod in a sub-face of the convex periphery of the pastille-shaped solid portion of said pod when the latter is inserted into said insertion compartment, the other face of the pod in the convex periphery of the solid pastille-shaped solid portion of said pod bearing against the front face of the first male part when said pod is inserted into said insertion compartment, said flange of the pod being able to be inserted into a space forming a slot between the lower portion of the front face of said cradle and the lower portion of the front face of said first male part when said pod is inserted into said insertion compartment.

It is understood that:

said insertion compartment has in its lower portion, a lower aperture between the lower portion of the cradle and the lower portion of the front face of the first male portion, of a lesser width in said axial longitudinal direction XX' than the width of said pastille in which said flange is inserted without being folded so that the pod remains in said insertion compartment, in said tilted position of the cradle, and the diameter of said orifice of said cradle is larger than that of said first male part so that the latter may cross it in said closing position.

It is also understood that because said pod is supported in a sub-face of the convex periphery of the pastille-shaped solid portion of said pod on its two faces, when the latter is inserted in said insertion compartment, the lower portion of said cradle in a tilted position reaches a height substantially at the same level as the lower portion of the front face of the first male part and therefore facing the front aperture of said chamber when said pod is inserted into said insertion compartment; and by rotation in the vertical position, the lower portion of the cradle is cleared below said piston and below the limit of the front aperture of said chamber.

Preferably, said front surfaces of said cradle and of the aperture of said chamber are non-cylindrical axisymmetrical surfaces of revolution.

Still more particularly, the device includes:
a—a said first fixed male part, and
b—a said second female part able to be moved in translation, and
c—a said third part pivotally mounted on said second female part, said aperture of said chamber being below and in front of the pivot axis Y1Y1 of said third part, said orifice of said third part being able to be crossed by said first male part and located in front of said second part in said closing position.

Still more particularly, said cradle forms a ring, the oblong orifice of which includes in the upper portion a semi-circular upper half-circumference including a said front surface able to continuously support the upper portion of said flange and said orifice includes in a lower portion a semi-circular lower half-circumference including a said front surface able to continuously support the sub-face of said solid pastille on one of its faces when said cradle is in a forward tilted position of the aperture of said internal chamber, said orifice being bordered on one portion of its height by two side edges capable of laterally bordering said flange and maintaining it coaxial with said longitudinal axis XX', the two upper and lower semi-circular portions being connected together through vertical rectilinear portions at said side edges.

It is understood that both of these vertical rectilinear portions at said side edges connecting together the two upper and lower semi-circular portions of said orifice give the possibility of ensuring clearance below said piston and the aperture of said chamber when said cradle is in a vertical position.

Still more particularly, said front face of the first male part includes:
a non-cylindrical peripheral axisymmetrical surface of revolution about said longitudinal axis XX', preferably a frusto-conical surface, and
a central surface with a circular circumference of same said longitudinal axis XX', preferably a vertical planar surface, covered with a first perforated plate, and
an intermediate axisymmetrical surface of revolution about the same said longitudinal axis XX' surrounding said central surface, preferably frusto-conical surface, said intermediate axisymmetrical surface of revolution having a diameter which increases from said central surface as far as said peripheral axisymmetrical surface of revolution, said peripheral axisymmetrical surface of revolution having a diameter which decreases from its maximum circumference to its closest rear end of the cylindrical wall of said internal chamber in said closing position, as far as its front end forming the front end of said front face of the first male part, and in said closing position, said front face of the first male part delimits with the cylindrical internal wall of said internal chamber, a peripheral housing capable of containing the folded flange relatively to the vertical axial plane perpendicular to said longitudinal axis XX' of said pastille, when said pastille is in said extraction chamber.

It is understood that said flange is substantially folded to 90° relatively to an axial plane of said pastille perpendicular to the longitudinal direction XX' of the device when the pod is housed in said extraction chamber.

On the other hand, said flange may be locally extended with a radial extension forming a tab, in which case said housing is capable of containing said tab.

It is also understood that said flange has a said mainly circular section in a vertical axial plane perpendicular to said axial longitudinal direction XX' when said flange is in a position in said insertion compartment in said opening and insertion position.

The device according to the present invention is advantageous in that the flange of the pod is not subject to any stress other than its folding without it being required that it resume its vertical straight shape and without the flange being clamped, the flange not being involved in the seal of the extraction chamber.

The device according to the present invention is therefore advantageous in that it allows application of an ordinary pod comprising a cover in a porous or microperforated flexible material, and therefore relatively fragile once it is wet, for example, of the paper filter type, without it being required that the flange be in reinforced cardboard.

More particularly, the flexible peripheral edge of the flange of the pod folds to 90° upon its introduction into the extraction chamber by relative translation of both first and second parts as this is explained hereafter, and inside its housing.

By "flat or ovoidal" is meant that the pod has two symmetrical faces with a flat or lenticular portion on either side of its diametrical plane, which is also the plane of the flange.

More particularly, the pod consists of two half-covers forming two half-shells joined together at their periphery, notably adhesively bonded against each other, so as to form said flange, said flange radially extending said cover and preferably made in the same material as the remainder of said cover.

The external diameter of said first male part is slightly less than the internal diameter of said cylindrical chamber, and therefore of the orifice of said cradle.

Said cradle is laterally open on its two faces, its said side apertures being of a diameter greater than or equal to that of said cylindrical chamber and of said piston so that said first male part may pass through them.

The internal diameter of the cylindrical chamber is slightly greater than that of the pastille-shaped solid portion of powder of the pod, and less than the maximum diameter of the flange, so that in the case of relative translation of the first part from said opening position to said closing position, said flange folds and finally (in the closing position) will be housed in said housing of the folded flange.

It is understood that:
the central surface and the intermediate axisymmetrical surface of revolution form surfaces bearing against the solid portion of the pod, said central surface of the external face bearing against the central portion of the front side face of said pod and said intermediate axisymmetrical surface of revolution being a supporting surface of the convex peripheral portion of said pastille-shaped solid portion of the pod. When said pod is compressed in said extraction chamber in said closing position, and said central supporting surface of the external face of said first part is therefore set back in the axial longitudinal direction XX' relatively to the front end of the external front face of the first male part, and said frusto-conical intermediate axisymmetrical surface of revolution and peripheral axisymmetrical surface of revolution form a front end of said external face peaked relatively to said central surface which is set back, and said "peaked front end" of said front face of said first male part has a circular cross-section, the cross-section implying a section in the direction perpendicular to said longitudinal axial direction XX', and the perforations of the first perforated plate allow passing of the pressurized liquid loaded with aromas after having crossed the pod in the extraction chamber, and then the discharging of the liquid through a discharge conduit, the housing of the folded flange has a triangular shape in section in a longitudinal axial plane of the device when the peripheral axisymmetrical surface of revolution is frusto-conical.

The frusto-conical shape of the intermediate axisymmetrical surface of revolution of said external face is particularly advantageous for removing and disengaging the pod of the supporting central surface from the external face, and allowing ejection by gravity of said pod upon returning to an open position from a closing position, as explained hereafter. Indeed, this frusto-conical surface limits the contact surface with the convex peripheral portion of the pastille of the pod once it is in said opening and discharge position.

Still more particularly, said first male part comprises:
a recessed rear portion having a cylindrical peripheral external surface, and
a front portion partly contained in the recess of said rear portion, said front portion comprising a said external front face not contained in said recess of said rear portion, and
said rear portion being connected and/or capable of cooperating with said front portion, through a first elastic element, preferably a first spring, and
a deformable O-ring gasket inserted between said rear portion and said front face of said front portion, producing the seal of said extraction chamber when longitudinal compression against said front face of the first male part is achieved by relative translation of said first male part and second female part in said closing position.

This positioning of said gasket is advantageous in that the latter has no or little contact or friction with the female part during the opening or closing phases.

It is understood that:
the longitudinal compression exerts a thrust from the front towards the rear of the first male part, and
the seal is ensured by the increase of a greater diameter of the gasket produced by radial deformation causing ovalization of the gasket, and
the seal of the extraction chamber is achieved between (i) the surface of the cylindrical wall of the internal chamber of the second female part and (ii) the gasket delimiting (a) the cylindrical surface of the cylindrical portion of the front portion and (b) said face of the first male part, more particularly said peripheral axisymmetrical surface of revolution of said external face, but on the other hand, in the absence of compression, the peripheral diameter of said gasket allows said relative translation of said first male part and second female part.

Said first spring is particularly advantageous for allowing deformation with expansion of said gasket so that it resumes its initial shape.

Still more particularly, the second female part comprises a second vertical plate, preferably perforated, within said internal chamber with a cylindrical wall, with a diameter adjusted to the internal diameter of a recess or a recessed housing at the bottom of said internal chamber, said second plate being capable of moving in a longitudinal relative translation relatively to said internal chamber, between:
i—the bottom of the internal chamber, and
ii—a discharge position outside said internal chamber, preferably just at the aperture of said chamber, and
the relative translation of said second plate is able to be synchronized with said relative translation means of said first male part and second female part so that:
i'—said second plate may be positioned in the rear of said insertion compartment, in a first open position forming an initial insertion position, and be moved towards the bottom of said chamber during a relative translation for bringing said female part closer to said first male part from said opening and insertion position as far as a said closing position, and
ii'—said second plate may be moved from the bottom of said chamber to the outside of said chamber, preferably at the front aperture of said chamber after relative translation for moving said second female part away from said first male part from said closing position to as far as a said opening and discharge position.

Said second plate fulfills a function for supporting the pod on its rear side face inside said internal chamber and may also allow discharge of the pod when said second plate is positioned so that the pod is outside of the second female part.

It is understood that the perforations of said second perforated plate allow the passing of the pressurized liquid through said pod in said extraction chamber, preferably supplied through a supply conduit opening into said internal chamber, preferably at the bottom of said internal chamber.

It is understood that by "moving closer" or "moving away" of both first male part and second female part, is meant if necessary "moving closer" or "moving away" the front face of said first male part relatively to the bottom of said cylindrical chamber.

Still more particularly, said second female part further comprises a supporting and ejection element comprising a said second plate connected to the front of a rod passing through the bottom of the cylindrical chamber, said rod and said second plate being able to be translationally blocked when said second female part is moved in reverse translation from a said closing position to a said open and ejection position because the rear end of said rod on the outside and at the rear of said female part is blocked by an abutment positioned behind said second female part.

Still more particularly, said relative translation means are able to move said second movable female part relatively to a said first fixed male part, said first male part being fixed to a chassis, said chassis ensuring the guiding in coaxial longitudinal relative translation of the second movable female part relatively to said first fixed male part and the guiding in relative translation and rotation of said third part.

More particularly, said third part is guided in rotation by guiding elements secured to said third part and moved along additional guiding elements forming a guide path such as a non-entirely horizontal grooved path i.e. including at least one portion which does not extend in the axial horizontal direction of relative translation of said first and second parts, said additional guiding elements being secured to said chassis and allowing the pivoting of said third part to be guided and controlled when said first and second parts are moved in relative translation.

Still more particularly, said relative translation means comprise a system of connecting rods which may be manually actuated with a lever or preferably in a motor-driven way with a cylinder actuator, said system of connecting rods ensuring the kinematic connection in translation of said second female part relatively to said first male part.

It is understood that said translation means ensure kinematic connection in translation between said second female part and said chassis.

Still more particularly, when the relative translation means comprise a lever located above said second female part and a system of connecting rods, a system of belts and pulleys or gears ensure transmission of the movement of rotation of the lever to the system of connecting rods.

The present invention also provides a method for using a device according to the invention, characterized in that the following successive steps are carried out:

1—said pod is inserted by gravity in a tilted position in a said insertion compartment, said first male part and second female part being in said open and insertion position, one face of the pod in the convex periphery of the pastille-shaped solid portion of said pod bearing upon the lower portion of the front surface of said third part, the other face of the pod in the convex periphery of the pastille-shaped solid portion of said pod bearing against a lower portion of the front face of a said first or second part, and then 2—relative rotation and/or translation is carried out for bringing closer both said first male part and second female part and rotation and then translation of said third part, from said insertion position to as far as a said sealed closing position in which the orifice of said third part in said vertical position is crossed by at least one of said first and second parts, and said pod is compressed in a said sealed extraction chamber, and then 3—an injection of liquid through said pod and discharge of said liquid from said extraction chamber are carried out, and 4—a relative translation and/or rotation for moving away both said first male part and second female part from said closing position to as far as a said open and discharge position, said third part in a vertical position being moved in translation and then in rotation in said tilted position, said pod being moved in a said discharge compartment in which the pod is discharged by gravity.

More particularly, for the infusion of a said pod comprising a said pastille surrounded with a peripheral flat flange extending in an axial plane of said pastille and capable of folding relatively to said axial plane, the method according to the invention is characterized in that the following successive steps are carried out:

1—a said pod with its flange in a tilted position is inserted by gravity in a said insertion compartment, said first male part and second female part being in said open and insertion position, one face of the pod in a convex periphery of the pastille-shaped solid portion of said pod bearing upon the lower portion of the front surface of said third part, the other face of the pod in a convex periphery of the pastille-shaped solid portion of said pod bearing against a lower portion of the front face of the first male part, said flange of the pod being inserted into a space forming a slot between the lower portion of the front face of said third part and the lower portion of the front face of said first male part when said pod is inserted into said insertion compartment, and then 2—relative translation is carried out for bringing both said first male part and second female part closer and rotation followed by translation of said third part, from said insertion position to as far as a said sealed closing position in which the orifice of said third part in said vertical position is crossed by at least said first part, and preferably crossed by said pastille-shaped solid portion of said pod and by said first part, and said pod is flattened and compressed in a said sealed extraction chamber between the front face of the first male part and the bottom of said chamber, and then 3—an injection of liquid through said pod and discharge from said extraction chamber are carried out, and 4—a relative translation is carried out for moving away both said first male part and second female part from said closing position to as far as a said opening and discharge position, said third part in a vertical position being moved in translation towards the front aperture of the chamber, and then in rotation in said tilted position, said pod being moved from the bottom of said chamber towards the front aperture of said chamber in a said discharge compartment in which the pod is discharged by gravity.

Other features and advantages of the present invention will become apparent in the light of the detailed description which follows, made in an illustrative and non-limiting way with reference to the appended drawings wherein:

FIG. 1 illustrates a perspective view of a device according to the invention 1 positioned inside a chassis 1-3, ensuring the maintaining and guiding in relative translation of a first male part or piston 1-1 and of a second female part 1-2 comprising a cylindrical chamber 5.

Figure 1A:
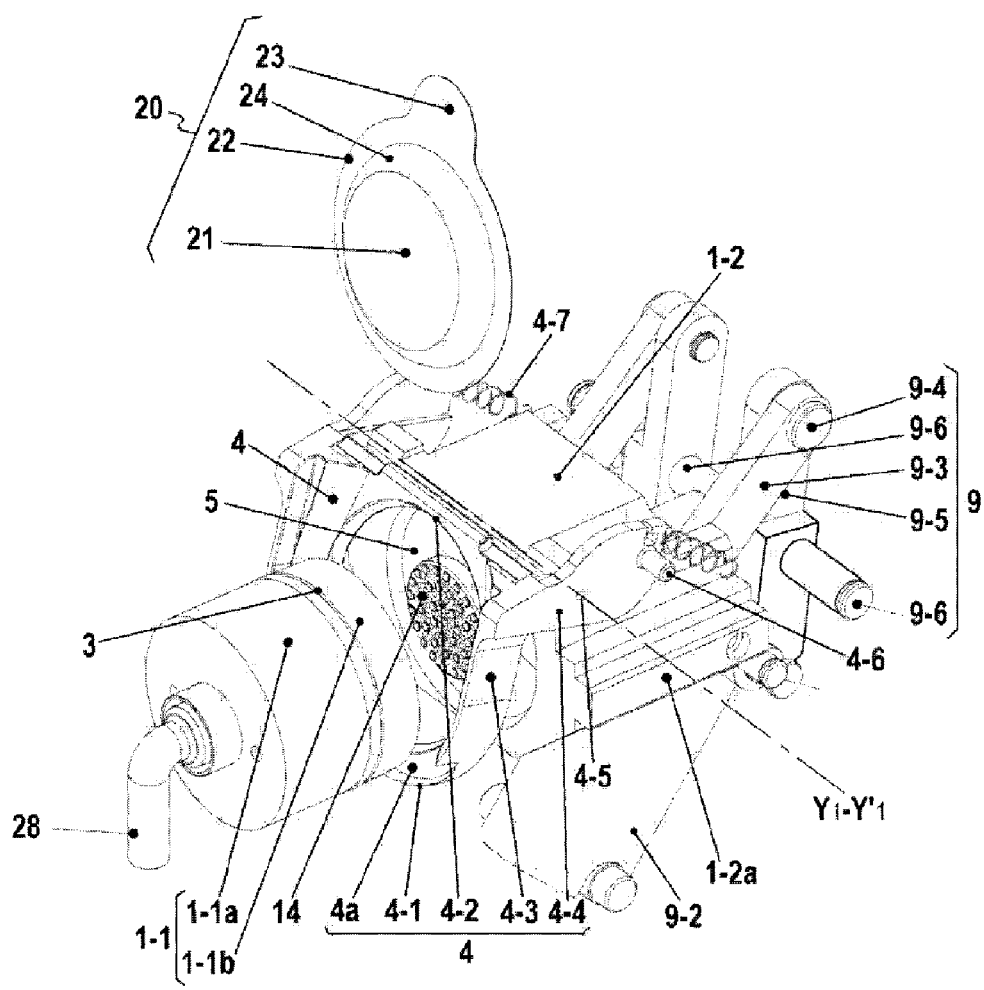

FIG. 1A is a perspective view of a device according to the invention of FIG. 1, without the chassis 1-3 and with a cylinder 9-2 for actuating the relative translational displacement means 9 of said first male part 1-1 and second female part 1-2.

Figure 1B:
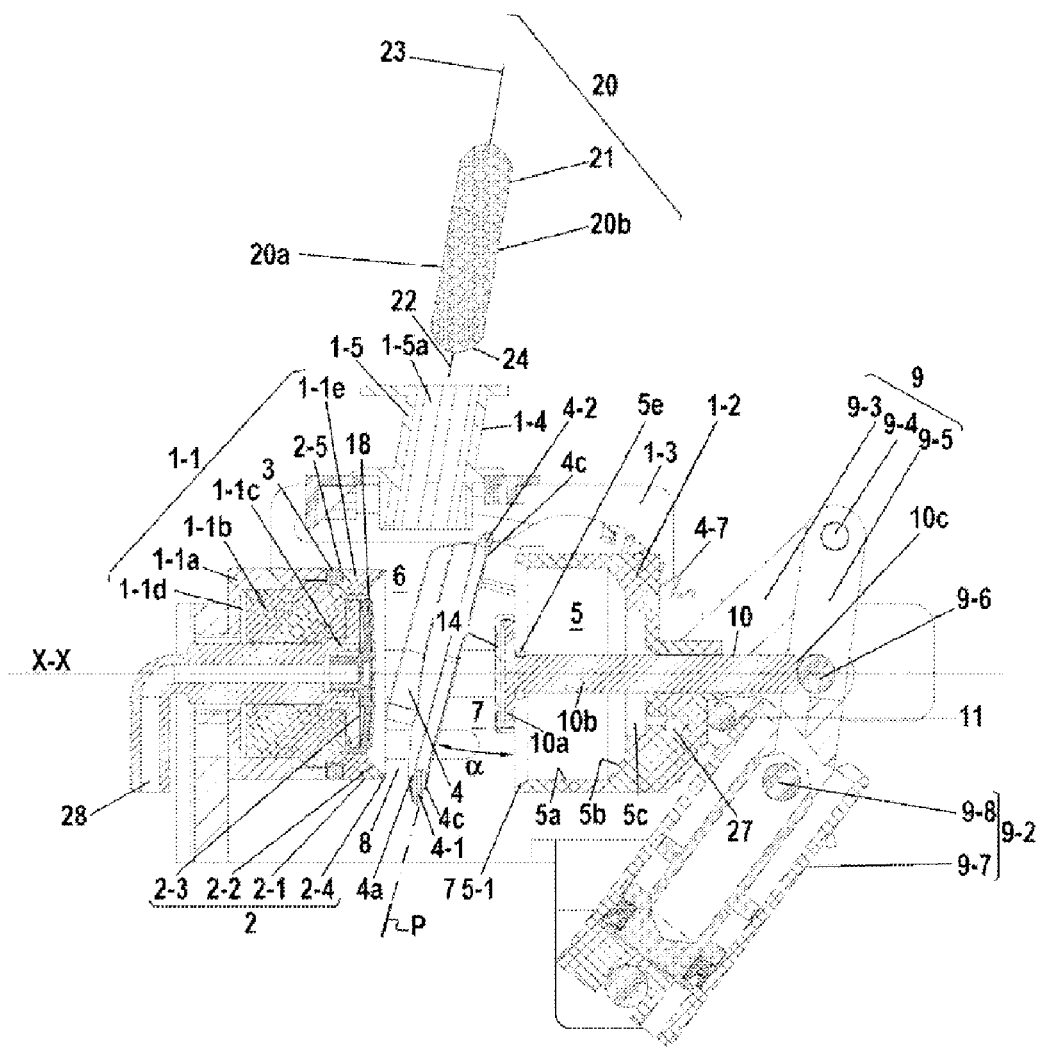

FIG. 1B is a side view in a vertical longitudinal section of the device of FIG. 1A, in an initial open position before inserting the pod 20 into an insertion compartment 6 delimited on one side by the front face of the piston 1-1 facing a face 20a of the pod 20 and, on the other side, of the cradle 4 in a tilted position facing the opposite face 20b of the pod.

FIG. 2 is a longitudinal and perspective sectional view of a device according to the invention, comprising a lever 9-1 for manually actuating the relative translation displacement means 9 of said first male part 1-1 and second female part 1-2, the pod being inserted into said insertion compartment 6 in an initial open position.

FIG. 2A illustrates the detail A of FIG. 2 showing the convex peripheral lower portion 24 of the solid portion or pastille 21 of the pod 20 bearing upon frusto-conical axisymmetrical surfaces 2-1 and 4a of the front face 2 of the piston 1-1 and, respectively of the cradle 4 in its lower portion 4-1.

FIG. 3 illustrates a perspective view of the piston 1-1 alone.

FIG. 4 is a perspective view of the second female part 1-2 equipped with a cradle 4 which is attached to it by a joint rotating along a transverse axis $Y_1Y_1$ perpendicular to the longitudinal axis XX of said first male part 1-1 and second female part 1-2.

FIG. 5 is perspective view of the cradle 4 alone.

FIGS. 6A, 6B, 6C, 6D, 6E, AND 6F illustrate in a perspective view and in a vertical longitudinal middle sectional view, partial views of both first male part 1-1 and second female part 1-2 in different relative positions.

FIGS. 7A, 7B1, 7B2, 7C, 7D, 7E1, 7E2, 7F1, and 7F2 also illustrate schematic side views, in a middle longitudinal section of both first male part 1-1 and second female 1-2 in different relative positions, from a said open position in which the pod is in an initial tilted position for insertion to as far as a discharge position for the pod 20 from an discharge compartment 7 delimited by the front face 5-1 of the cylindrical chamber 5 of the female part 1-2 and the rear face of the tilted cradle 4.

Figure 8:
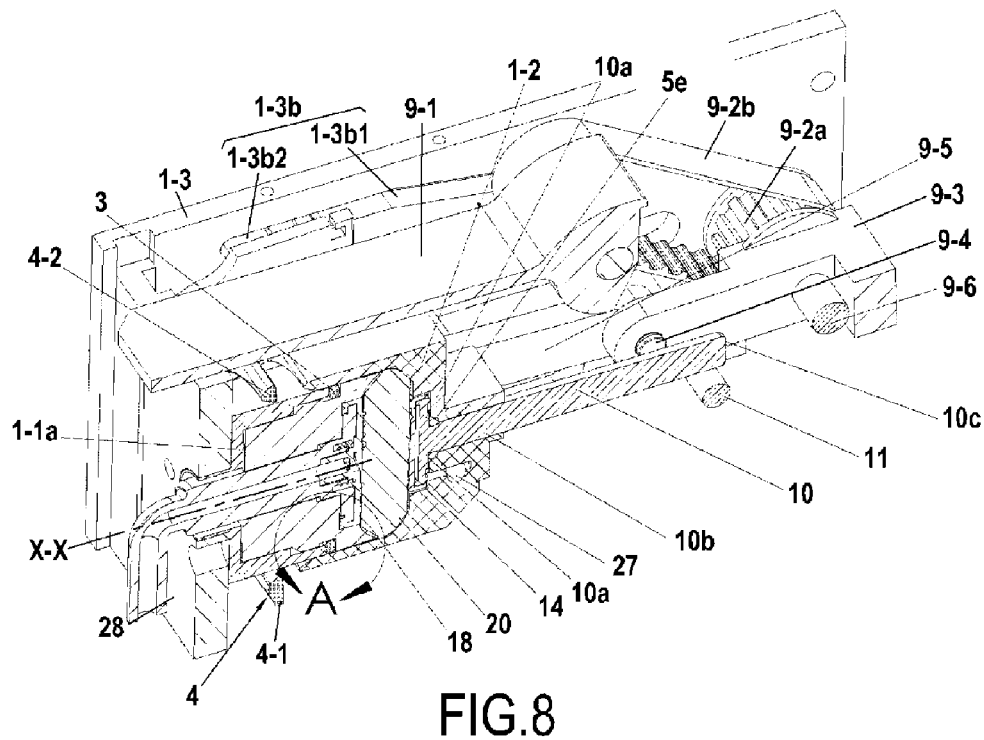

FIG. 8 is a perspective middle longitudinal sectional view of a device according to the invention equipped with a lever 9-1, in which the pod is in a compression position in a sealed compartment, sealed by an ovalized O-ring 3, delimited by the front faces of the piston 1-1 and the bottom of the cylindrical chamber 5.

Figure 8A:
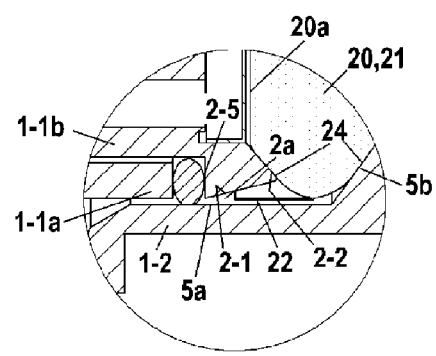

FIG. 8A illustrates the detail A of FIG. 8, showing the flange 22 in the folded position in a peripheral housing 2a of said sealed compartment.

FIG. 8A is an exaggerated detailed schematic illustration a of FIG. 8 in which the angle between the peripheral frusto-conical surface 2-1 and the cylindrical wall 5a has been enhanced in order to better view the housing 2a receiving the folded flange 22.

The term of "cradle" is used here in order to indicate that the relevant part is a supporting part with a curved shape.

The terms of "front" and "rear" in connection with the different parts have been defined earlier.

For the cradle, the front face is the face facing the piston and the rear face is the face facing the aperture 5-1 of the chamber 5.

In FIG. 1 a device according to the invention 1 is illustrated, comprising a first fixed male part 1-1 inside a chassis 1-3. The chassis 1-3 includes horizontal longitudinal apertures 1-3a on its side walls used for guiding in axial longitudinal translation the movable female part 1-2, said movable female part 1-2 including external guiding elements 1-2a capable of sliding inside lateral horizontal longitudinal apertures 1-3a of said chassis 1-3.

As shown in FIG. 3, the first male part or piston 1-1 comprises:
- a rear portion 1-1a having a cylindrical peripheral external surface, said rear portion 1-1a comprising a cylindrical recessed internal housing 1-1d;
- a front portion 1-1b comprising a cylindrical internal portion 1-1c totally or partly contained in the hollow cylinder 1-1d of said rear portion 1-1a, an external portion 1-1e comprising an external front face 2 forming the external front face of the first male part 1-1, said external portion 1-1e not being contained inside the hollow cylindrical portion 1-1d of the rear portion 1-1a and jutting out outside the latter;
- an elastic O-ring 3 surrounding the cylindrical portion of the cylindrical internal portion 1-1c just in the rear of the external portion 1-1e so that the deformable gasket 3 is inserted between said rear portions 1-1a and said external portion 1-1e comprising the external front face 2 of the first male part 1-1;
- a first spring 1-1c connecting said cylindrical internal portion of the front portion 1-1b with the bottom of the recess 1-1d of the rear portion 1-1a of the first male part 1-1, so that, in the extension position of the first spring 1-1c, the deformable gasket 3 is in a non-stressed position and does not jut out from the external cylindrical surface of the rear portion 1-1a in the radial direction relatively to the longitudinal axis XX' of the first male part 1-1.

In FIGS. 3 and 8A, it is shown that the front face 2 of said external portion 1-1e of said front portion 1-1b comprises:
- a planar circular central surface 2-3, perpendicular to the longitudinal axis XX' of the first male part 1-1, said circular central surface 2-3 being slightly set back relatively to a first perforated plate 18 with a same circular section as said circular central surface 2-3 and supported by the latter;
- a peripheral frusto-conical surface 2-1 with a diameter decreasing from the rear 2-5 of the external portion 1-1e to the peaked front end 2-4 of said surface 2-1 forming the front end of the front face 2 of the first male part 1-1, the largest diameter of the frusto-conical surface 2-1 at its rear end 2-5 not exceeding the diameter of the external cylindrical surface of the rear portion 1-1a of the first male part 1-1;
- an intermediate frusto-conical surface 2-2 inserted between said first perforated plate 18 and the front end 2-4 of the peripheral frusto-conical surface 2-1, said intermediate frusto-conical surface 2-2 surrounding said first perforated plate 18 and having a diameter which increases from said first plate 18 to as far as said front end 2-4 of the peripheral frusto-conical surface 2-1.

The internal cylindrical portion 1-1d of the rear portion 1-1b of the first male part 1-1 is crossed by a discharge conduit 28 opening onto the central surface 2-3 of the front face 2, so that the perforations of the first perforated plate 18 allow discharge of the flavored liquid after the extraction step described hereafter.

Figure 6A:
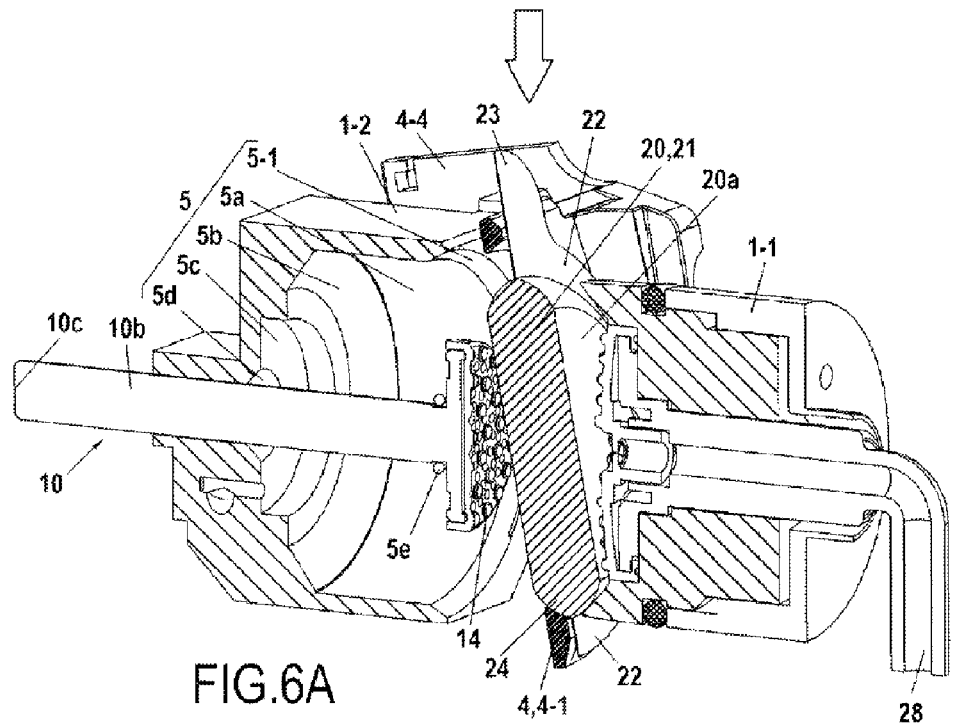

As shown in FIGS. 1B, 2 and 6A, the second female part 1-2 comprises a body delimiting an internal chamber 5 with a cylindrical wall 5a of a diameter slightly greater than the maximum diameter of the first male part 1-1, i.e. the diameter of the external cylindrical surface of the rear portion 1-1a of the first male part 1-1. The open front end of the cylindrical chamber 5 is delimited by a frusto-conical surface 5-1 and opens onto an discharge compartment 7 delimited by the rear face 4c of the cradle 4.

The frusto-conical surface 2-1 of the piston 1-1 delimits with the internal cylindrical surface 5a of the chamber 5 and housing 2a when the piston 1-1 is inside the chamber 5 with minimum separation from the parts 1-1 and 1-2 in relative translation. The angle between said peripheral frusto-conical surface 2-1 and the horizontal cylindrical cover surface 5a of the chamber 5 is from 1 to 5°.

In an embodiment, the housing 2a of the folded flange 22 represents a length of 8 millimeters in the longitudinal direction XX' and a width of about 2 millimeters in the radial direction perpendicular to the direction XX', representing the difference between the diameter of the front end 2-4 of the front face 2 of 43 millimeters and the internal diameter of the cylindrical wall 5a of 45 millimeters.

In an embodiment, the backward movement of the front face 2 of the first male part 1-1 during its longitudinal compression is 0.5 millimeters, which is sufficient for deforming the O-ring 3 by ovalizing it so as to suppress the functional play of 1 millimeter between the external diameter of 44 millimeters of the rear portion 1-1a of the first male part 1-1 and the diameter of the cylindrical wall 5b for forming a closed and sealed extraction chamber.

A cradle 4, formed with a ring delimiting a partly circular or oval aperture 4b, is attached on the second female part 1-2, via two side arms 4-4 supporting an axis positioned along a transverse horizontal direction $Y_1Y_1$, attached at orifices 4-5 of the arms 4-4 and secured to the upper portion of said second female part 1-2 on each of its faces, so that said cradle 4 may be jointed in rotation, as explained hereafter, in front of the aperture 5-1 in the front face of the chamber 5 of the second female part 1-2.

More specifically, the cradle 4 may pivot between a vertical position of its planar rear face 4c and a tilted position of its rear face 4c.

In its maximum tilt position, the plane P of the rear face 4c is tilted by an angle α from about 10 to 30°, more particularly 16°, relatively to the vertical in the front face of the aperture of the chamber 5 or in the front face of the piston 1-1, the cradle 4 delimits:

an insertion compartment 6 between the front face 2 of the piston 1-1 and the front face of the cradle 4, when the second female part 1-2 and the piston 1-1 are in a position with maximum separation, and an discharge compartment 7 between the aperture 5-1 of the chamber 5 and the rear face 4c of the cradle 4, when the piston 1-1 and the female part 1-2 are in a position of maximum separation in relative translation.

Elastic return means or springs 4-7, attached on the top of the first movable parts 1-2 on the one hand and at the arms 4-4, ensure that the cradle is maintained in a maximum tilt position, in the absence of any thrust force exerted on the lower portion 4-1 of the cradle in the case of relative translational displacement of the second female part 1-2 towards the piston 1-1, as this will be explained hereafter.

The aperture 4b of the cradle 4 is delimited by a front frusto-conical surface 4a and surrounded in the upper portion by side edges 4-3.

It is understood that the attachment axis with pivoting of the arms 4-4, on the upper portion of the second female part 1-2, are positioned set back rearwards relatively to the front aperture 5-1 of the chamber 5.

The side branches 4-4 of the cradle include, on their external face, guiding elements or fingers 4-6, engaged into grooves 1-3b of the chassis 1-3, so as to guide and control the pivoting of the cradle 4 when the second female part 1-2 is displaced in relative translation relatively to the piston 1-1, as this will be explained hereafter. To do this, the groove 1-3b includes two rectilinear portions, tilted relatively to each other, a first portion 1-3b1 of which tilted relatively to the horizontal is extended with a second horizontal portion 1-3b2. The first portion 1-3b1 is on the side of the first male part and the second portion 1-3b2 is on the side of the second female part.

In an initial open position of the insertion compartment 6, both first male part 1-1 and second female part 1-2 are in a position of maximum separation in relative translation, relatively to each other. Because of the tractions exerted by the springs 4-7 on the side arms 4-4, the fingers 4-6 reach the bottom of the tilted grooved portion 1-3b1, in the low portion of the latter, and the lower portion 4-1 of the cradle 4 reaches the proximity of the peak 2-4 of the front face 2 of the piston 1-1 at its lower portion, by making a space with the shape of a slot 8 capable of receiving the flange 22 when the pod 20 is inserted through the open upper aperture of the insertion compartment 6. The compartment 6 has a V shape delimited by the front face 2 of the piston 1-1 and the front face 4a of the cradle 4.

In this initial open position, the pod is retained in the insertion compartment 6 in the following way:

on the one hand, a rear face 20b of the pod will at the convex peripheral lower portion 24 of the pastille 21 bear against the front frusto-conical surface 4a of the cradle 4, the portion of the frusto-conical surface 4a in the lower portion 4-1 of the cradle 4 preventing the pod from falling, and on the other hand, the lower portion of the convex peripheral portion 24 of the front face 20a of the pastille 21 of the pod 20 reaches and bears against the lower portion of the intermediate frusto-conical surface 2-1 of the front face 2 of the piston 1-1, as illustrated in FIG. 2A.

In this initial open position for inserting the pod into the insertion compartment 6, the frusto-conical surface 4a of the front face of the lower portion 4-1 of the cradle is facing the front face 2 of the piston 1-1 in its lower portion. This initial pressure in the sub-face of the solid area 24 of the pastille 21 of the pod 20, on both sides 20a and 20b of the pod, guarantees perfect coaxiality of the pod when the latter is in a vertical position after pivoting the cradle 4, as described hereafter.

In this initial open insertion position, the pod is also maintained laterally because the external edges of its flange 22 are retained by the lateral edges 4-3 in the front of the frusto-conical surface 4a on the front face of the cradle 4, its arms 4-3 are interrupted so that the lower portion 4-1 of the cradle does not include any side arms 4-3, so as to make the slot 8 so that the flange 22 may pass between the tip 2-4 of the front face of the piston 1-1 and the foremost advanced portion of the lower portion 4-1 of the cradle 4 on its front face.

When the second female part 1-2 is moved in relative translation so as to move closer to the piston 1-1 as this will be described hereafter, the external guiding elements 4-6 of the cradle 4 concomitantly move in the tilted rectilinear portion of the groove 1-3b1, which thus causes pivoting of the cradle 4 so that the angle, between its rear face 4c and the vertical, decreases until the elements 4-6 reach the second horizontal portion of the groove 1-3b2, the cradle then being with its rear face 4c in a vertical position. At this stage, the lower portion 4-1 of the cradle 4 is entirely cleared below the cylindrical lower surface 5a of the chamber 5. Thus, the aperture 4b of the cradle is such that, when horizontal translation of the assembly of the second female part 1-2 and of the cradle 4 in a vertical position is continued, the piston 1-1 may cross the aperture 4b without being hampered by the lower portion 4-1 of the cradle 4.

The aperture 4b of the cradle actually has a size greater than the surface area of the circular section of the external cylindrical surface of the piston 1-1, so as to allow the piston 1-1 to cross it at the end of the tilting in a vertical position of the plane of the orifice 4b and then to cause relative translation of the cradle around the piston 1-1.

When the pod 20 is in the insertion compartment 6 and the relative translational movement of the second female part 1-2 is carried out towards the piston 1-1 and therefore the pivoting of the cradle 4 as far as its vertical position on the one hand and that the piston 1-1 crosses the aperture 4b of the cradle 4 on the other hand, the piston carries away inside the chamber 5, the pod 20 with it, the flange 22 of which folds. The folding of the flange 22 is promoted by the frusto-conical front face 5-1 of the aperture of the chamber 5. The folding conditions of the flange 22 in a peripheral housing 2a will be described hereafter.

The aperture 4b of the cradle 4 is in fact formed with an upper portion 4-2, delimiting an upper semi-circular section of the orifice 4b, and a lower portion 4-1, delimiting a lower semi-circular section of the orifice 4b, both semi-circular portions being joined with vertical side portions 4-8 of a same height d. Because of this vertical distance d, the lower portion 4-1 of the cradle is found below the cylindrical surface around the piston 1-1 and surrounds it when the latter pivots from the maximum tilt position of FIGS. 1B and 6A as far as the vertical position of FIG. 6B.

The intermediate frusto-conical surface 2-1 of the front face of the piston has a circular section substantially identical with that of the solid pastille 21 of the pod 20.

Thus, in the vertical position of the pod after pivoting the cradle 4, the pod is no longer retained in its lower portion by the lower portion of the frusto-conical surface 4a of the front face of the cradle, because the latter is now disengaged below the piston 1-1; but the pod is nevertheless maintained against the front face of the piston 1-1 by a second plate 14 of an ejector 10, the latter bearing against the front face 20a of the pod 20 over the whole of the periphery of a convex peripheral portion 24 of the pod at this stage, as this will be described hereafter.

The cylindrical chamber 5 actually contains an element called an ejector 10 consisting of a rod 10b axially positioned in the axial longitudinal direction XX' of the cylindrical chamber 5 coinciding with the axial longitudinal direction XX' of the first fixed male part 1-1. The rod 10b ends at its front end with a transverse plate 10a, itself supporting a second perforated plate 14.

The rod 10b crosses the bottom 5b of the chamber 5 at a central orifice 5d. The bottom 5d of the chamber 5 comprises a recess 5c allowing a second vertical circular perforated plate 14 to be housed therein, covering the front end 10a of the rod 10b. The rod 10b is capable of being moved in an axial longitudinal relative translation relatively to the body delimiting the circular chamber 5 when the latter is moving in relative translation relatively to the piston 1-1 as explained hereafter.

The rear end 10c of the rod 10b is always located outside of the body delimiting the cylindrical chamber 5. When the first female part 1-2 is moved in relative translation towards the piston 1-1, in a relative translation for minimum separation of the two parts 1-1 and 1-2, the second perforated plate 14 is driven into relative translation towards the rear of the chamber 5 as far as in a recess 5c at the bottom of the chamber 5. An O-ring 5e surrounds the front end of the rod 10b just in the rear of the second perforated plate 14 and ensures the seal of the chamber 5 at its rear orifice 5d when said second perforated plate 14 is housed by compression in the recess 5c under the effect of the relative translation of the piston 1-1.

The body of the chamber 5 is crossed by a supply conduit 27 which opens onto the bottom 5b of the chamber 5 and allows the supply liquid to cross the perforations of the second perforated plate 14 and then cross the pod, the rear face 20b of which bears against said second plate 14 in the extraction chamber in a said relative translation closing position of said first male part 1-1 and second female part 1-2 as this will be explained hereafter.

As is explained hereafter, the translation of the female part 1-2 carries away concomitantly the ejector 10 in translation except under the two following conditions:

when the part 1-2 moves away from the part 1-1 and the rear end 10c of the rod 10b is retained in abutment against the horizontal axis 9-6 described hereafter, and
when the part 1-2 moves closer to the piston 1-1 and the plate 14 of the ejector will abut on the actual pod applied against the front face of the piston 1-1.

In FIGS. 2 and 8, in a first embodiment of a manual application, the relative translation means 9 allowing relative translation of the second movable female part 1-2 relatively to the first fixed male part 1-1, comprise a lever 9-1 which may be actuated in rotation around an axis of rotation 9-1a extending in a transverse direction perpendicular to said axial longitudinal direction XX'; an axis 9-1a, with ends which are secured to the chassis 1-3, above the body 1-2 of the cylindrical chamber 5. Said axis of rotation 9-1a drives into rotation a first cogwheel 9-2a which is secured to it and having a same axis. A toothed belt 9-2b surrounds and ensures the kinematic connection of the first cogwheel 9-2a with a second cogwheel 9-2a secured and driven into rotation by the axis of rotation 9-6, itself secured to the chassis 1-3. The pivoting of the lever 9-1 causes rotation of the first cogwheel 9-2a. And the rotation of the first cogwheel 9-2a drives into rotation the belt 9-2b and concomitantly the rotation of the second cogwheel 9-2a. The rotation of the second cogwheel 9-2a drives into rotation a first arm 9-3 of a system of connecting rods, said first arm 9-3 being secured at one of its ends to the second cogwheel 9-2a. The other end of the arm 9-3 is attached according to a joint rotating around an axis 9-4 at the end of a second arm 9-5, the other end of the second arm 9-5 being attached to the outside of the body delimiting the chamber 5 at a rotating joint secured to the body 1-2. Thus, the rotational actuation of the handle 9-1 causes pivoting of both arms 9-3 and 9-5 of the system of connecting rods 9 and translation of the second movable female part 1-2 in said axial direction XX'. The part 1-2 is blocked in translation from moving away from the piston 1-1 by a transverse abutment axis 11 secured to the chassis 1-3.

In fact, the first relative translation means 9 comprise two systems of connecting rods 9 each including a first arm 9-3 and a second arm 9-5 connected to the same lever 9-1 by two belt 9-2b and gear 9-2a transmission systems on either side of the vertical longitudinal axial plane of the body delimiting the cylindrical chamber 5.

The maximum upward pivoting position of the handle 9-1 determines an open and insertion position with maximum relative translation of said second movable female part 1-2.

Both arms 9-5 form the two branches of a U-bolt secured to the chassis 1-3 at the common transverse axis of rotation 9-6 at the lower end of the arms 9-5. The operation and the use of the device according to the invention are explained in the various following steps.

Said means 9 for relative translation of the second female part 1-2 relatively to the first male part 1-1 may be produced with a hydraulic system, with a piston, or with any other motor-driven system with a screw or cam or other means, instead of the connecting rod system described above.

The coaxial translational guiding of said second female part 1-2 and first male part 1-1 is ensured by male guiding elements 1-2a on the external face of the body of the cylindrical chamber 5 and by female guiding elements in the form of grooves or longitudinal apertures 1-3a in the chassis 1-3.

In FIGS. 1A and 1B, the arm 9-4 extends below the lower axis 9-6 and the connecting rod system 9 is directly actuated by a cylinder 9-2 and not manually by the lever 9-1. The rod of the cylinder 9-2 is connected to the lower end of the arm 9-4, which gives the possibility by actuating the cylinder 9-2 of causing rotation of the arm 9-4 around its middle axis of rotation 9-6, thus causing rotation of the upper connecting axis 9-3, jointed in rotation with the second arm 9-5.

In FIG. 1B, a chimney 1-5 has also been illustrated, positioned above the body forming the female part 1-2, tilted relatively to the vertical, defining an aperture 1-5a, the lower end of the aperture 1-5a of the chimney 1-5 coinciding with the upper aperture of the insertion compartment 6 when the cradle 4 is in a maximum tilt position, as illustrated in FIG.

1B. This gives the possibility of ensuring the guiding of the insertion of the pod 20 in a tilted position into its insertion compartment 6.

The application of the device according to the invention comprises the following steps:

1—In an initial step illustrated in FIGS. 6A and 7A, the lever 9-1 or the cylinder 9-2 have been actuated in order to cause maximum rotation of the system of connecting rods 9, so that said first male part 1-1 and second female part 1-2 are in a position of maximum separation in relative translation, called an open and insertion position, in which the cradle 4 is in a maximum tilt position because of the return spring 4-7 acting in traction on the end of its arms 4-4, causing the rotation of the cradle around its axis $Y_1Y_1$. In this maximum tilt position of the cradle, the lower portion 4-1 of the cradle is located in proximity to the peak 2-4 of the front face 2 of the piston 1-1, while making a space forming a slot 8, as shown in FIG. 2A, into which the flange 22 of the pod 20 is inserted when the pod 20 is positioned in the V-shaped insertion compartment 6, formed by the front face of the cradle 4 and the front face 2 of the piston 1-1.

In this initial position of maximum separation, the respective dimensions in the axial direction XX' of the ejector 10 and of the chamber 5 are such that the rear end 10c of the rod 10b of the ejector 10 is in abutment against the transverse axis 9-6 of rotation of the rear arm 9-4 of the connecting rod system 9, and the front plate 10a covered with the second plate 14 of the ejector 10 reaches substantially just in front of the aperture 5-1 of the chamber 5 and consequently at the rear of the cradle 4.

As explained earlier, in this initial insertion and open position, the pod 20 is maintained laterally at its flange 22 by the side edges 4-3 of the opening ring 4b of the cradle 4, while the lower portion 4-1 of the cradle supports, at said frusto-conical surface 4a of its front face, the periphery 24 of the convex solid portion of the pastille 21, in a sub-space of the latter. This pressure on the pastille ensures constant positioning of the pod, regardless of the dimensional variations of the flange, and more stable positioning of the pastille relatively to the longitudinal axis XX' than if the pod 20 was supported in its lower portion by the flange 22. On its front face 20a, the flange is only supported by the lower portion of the intermediate frusto-conical surface 2-1 of the front face 2 of the piston 1-1, always in a sub-face of the convex portion 24 of the periphery of the pastille 21 full of coffee of the pod 20.

In this initial open and maximum separation position of the parts 1-1 and 1-2, their respective front faces are separated by a maximum distance D.

Figure 6B:
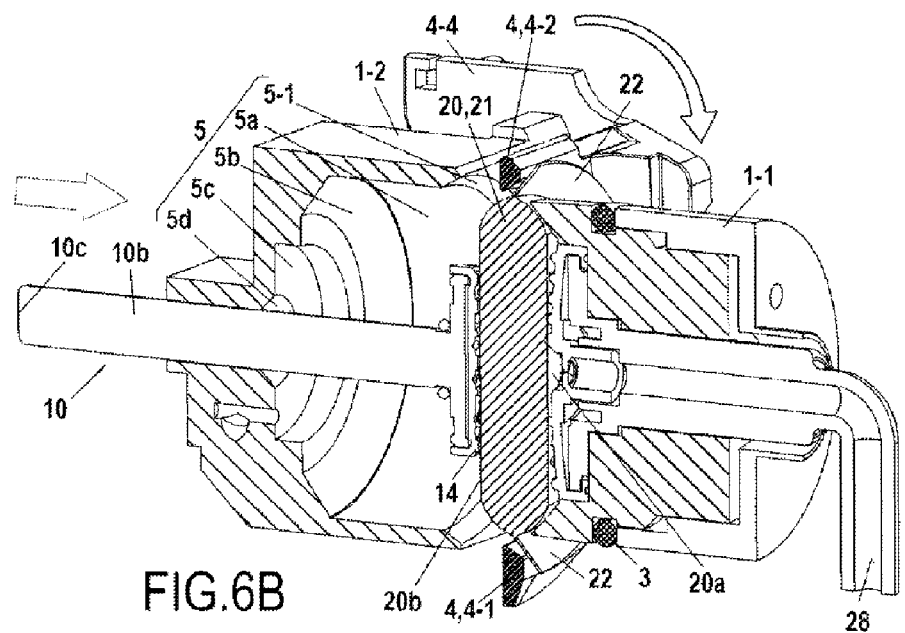

2—In FIGS. 6B and 7B1, the relative translation means 9 have begun to be actuated, so that the second female part 1-2 has been moved forward in the direction XX' by a length l1.

The distance separating the parts 1-1 and 1-2 is reduced by a same length l1. At this stage, the cradle 4 has pivoted in order to adopt a rear face 4c of its ring in a vertical position. The pod and the circular aperture 4b of the cradle are positioned vertically coaxially XX' with the piston 1-1 and with the chamber 5. The aperture 4b of the cradle being of a larger size than the vertical section of the piston 1-1 and of the aperture 5-1 of the said chamber 5, the upper portion 4-2 and the intercalary portion 4-1 of the aperture 4b are cleared above and respectively below the aperture 5-1 of the chamber 5, so that the piston 1-1 may cross and then penetrate into the chamber 5 by translation. At this stage, the pod is still maintained on its front face 20a by the intermediate frusto-conical surface 2-1 of the front face 2 of the piston 1-1 which supports the totality of the circumference of the peripheral convex portion 24 of the pastille 21 of the pod 20. On the other hand, the rear face 20b of the pod 20 is no longer retained in the lower portion of its convex peripheral portion 24 by the lower portion 4-1 of the cradle 4. However, once it is in this position, the plate 14 is always just in front of the aperture 5-1 of the chamber 5 and bears upon the rear face 20b of the pod 20, at the circular central surface of its full pastille 21, which is sufficient for supporting the pod 20 in a vertical position because its lower portion is sufficiently retained by the lower portion of the intermediate frusto-conical surface 2-1 of the front face 2 of the piston 1-1.

It will be noted that in this position of FIG. 7B, the rear end 10c of the rod of the ejector 10 is no longer retained by the abutment of the axis 9-6.

3—In FIG. 7B2, the translation of the part 1-2 by a length l2 in the direction of the fixed piston 1-1 was continued in the longitudinal direction XX'. But, the ejector 10 does not move since the plate 14 abuts upon the pod 20. Thus, the plate 14 in front of the ejector 10 moves backwards by a same length l2. And, the oval aperture 4b of the ring of the cradle 4 is crossed by the piston 1-1, at the pointed ends 2-4 of its front face 2. The latter drives the pod 20 still bearing upon its rear face 20b against the plate 14, causing the beginning of the folding of the flange 22. At this stage, the flange is found folded in the space between the frusto-conical external cylindrical surface 2-2 of the front face 2 of the piston 1-1 and the front face 4a of the aperture 4b of the cradle 4.

Figure 6C:
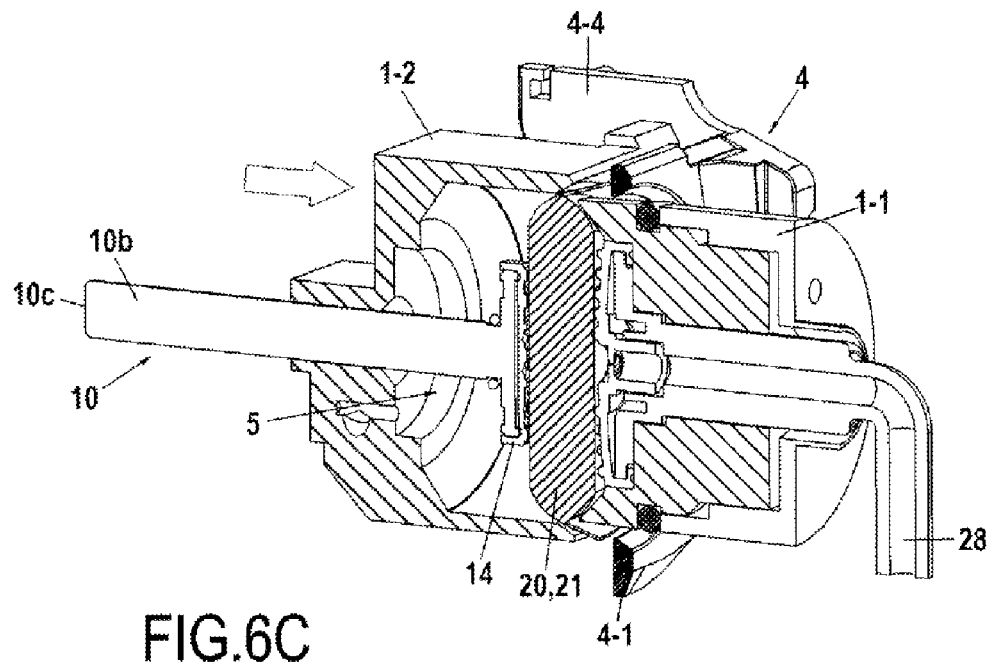

4—In FIGS. 6C and 7C, the relatively translation of the part 1-2 in the direction of the piston 1-1 by l3, was continued so that the pod and the folded flange 22 have totally crossed the aperture 4b of the cradle 4. The front tip 2-4 of the piston is just in front of the aperture 5-1 of the chamber 5 and the cradle 4 now surrounds the peripheral external frusto-conical surface 2-2 of the front face 2 of the piston 1-1 still in front of the O-ring 3. At this stage, the ejector 10 has not moved and is found at about half length in the direction XX' of the internal chamber 5.

The front frusto-conical surface 5-1 of the aperture of the chamber 5 promotes the maintaining of the flange 22 folded when the piston 1-1 penetrates into the chamber 5.

Figure 6D:
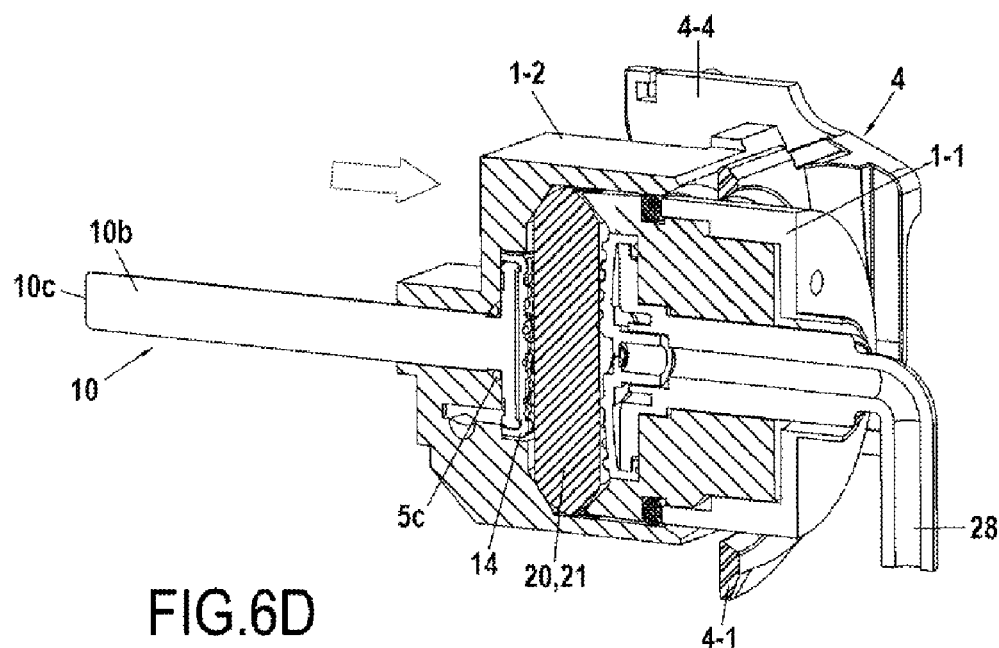

5—In FIGS. 6D, 7D and 8, the relative translation of the female part 1-2 by l4, was continued, so that the pod 20 will now bear upon its rear face 20b against the peripheral frusto-conical surface 5b of the bottom of the chamber 5, at its peripheral convex portion 24. And, the circular central portion of the pastille 21 will bear against the plate 14 of the ejector 10, which plate 14 will be housed in the notch 5c at the bottom of the chamber 5. In this position, the O-ring 3 of the piston 1-1, after having translationally covered the inside of the chamber 5 without any contact with the cylindrical wall 5a, is now found compressed and in sealed contact with the wall 5a, as shown in FIG. 8A. In this position of FIGS. 6D and 7D, the perforated plate 18 of the front face 2 of the piston 1-1 is bearing against the front face 20a of the pod 20, producing a compression of the pastille 21 of the pod 20.

In this position of FIGS. 6D and 7D, the flange 22 is folded in the housing 2a, as described in FIG. 8A.

The compression in the axial longitudinal direction XX' of the front portion 1-1c of the piston against the rear portion 1-1b of the piston 1-1 has the effect of compressing the gasket 3. Thus, the gasket 3 passes from its initial non-compressed position with circular cross-section to a compressed position in which the gasket 3 has an ovalized cross-section as illustrated in FIG. 8A, in which the largest diameter of the ovalized O-ring allows the gasket 3 to sealably bear against the cylindrical surface 5*b* of the chamber 5.

The compression of the O-ring 3 and of the gasket 5*e* closing the orifice 5*d* around the arm 10*b* of the ejector 10, ensures the seal of an extraction chamber. The portion of the inside of the chamber 5, delimited between the O-ring 3 and the gasket 5*e*, forms said sealed extraction chamber.

During this compression phase in the longitudinal direction XX', the first spring 1-1*c* is compressed. At this stage, the first male part 1-1 and second female part 1-2 are in relative translation for minimum separation or maximum closure.

Once step 5—above has been reached, a pressurized liquid may be injected into the supply conduit 28 which crosses the second perforated plate 14, and then the pod 20, and then the first perforated plate 18 and is discharged through the discharge conduit 27 in order to obtain a beverage enriched with aromas extracted from the powder contained in the pod 20.

Figure 6E:
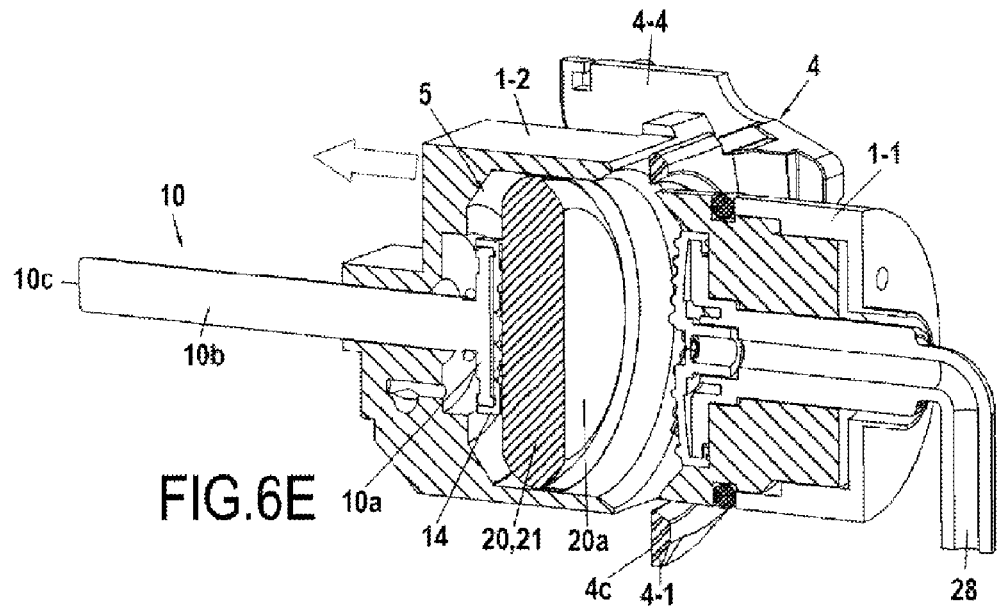

6—Next, the lever 9-1 is actuated in rotation upwards or the cylinder 9-2 is actuated so as to reach a position illustrated in FIGS. 6E and 7E1 by relative translation displacement of the female part 1-2 in the opposite direction.

As soon as the longitudinal compression against the front face 2 of the first male part 1-1 is released by actuating the lever 9-1 in rotation upwards, the first spring 1-1*c* exerts a forward thrust of the front face 2 of the first male part 1-1 and the gasket 3 resumes its initial non-stressed shape with a circular section 3*a*, the latter no longer being in contact with the cylindrical surface 5*a* of the chamber 5 during this reverse translation. The ejector 10 is driven into relative translation, concomitantly with the female part 1-2 since the pod 20 continues to bear upon the bottom of the chamber 5 against the plate 14. The pod 20 remains stuck at the bottom of the chamber 5 because the supporting surface 5*b* on the bottom of the chamber 5 is larger than the frusto-conical supporting surface 2-1 of the front face of the piston 1-1. The flared frusto-conical shape of the intermediate surface 2-2 of the front face 2 of the first male part 1-1 also promotes detachment of the front face 20*a* of the pod 20 relatively to the first perforated plate 18.

7—In FIG. 7E2, the relative backward translation of the part 1-2 relatively to the piston 1-1 was continued. Because the rear end 10*c* of the rod 10*b* of the ejector 10 is retained in abutment on the axis 9-6, the plate 14 moves out of the recess 5*c* at the bottom of a chamber 5 and moves in relative translation relatively to the chamber 5, the pod 20 substantially arriving at a half-length of the chamber 5 in the direction XX'.

Figure 6F:
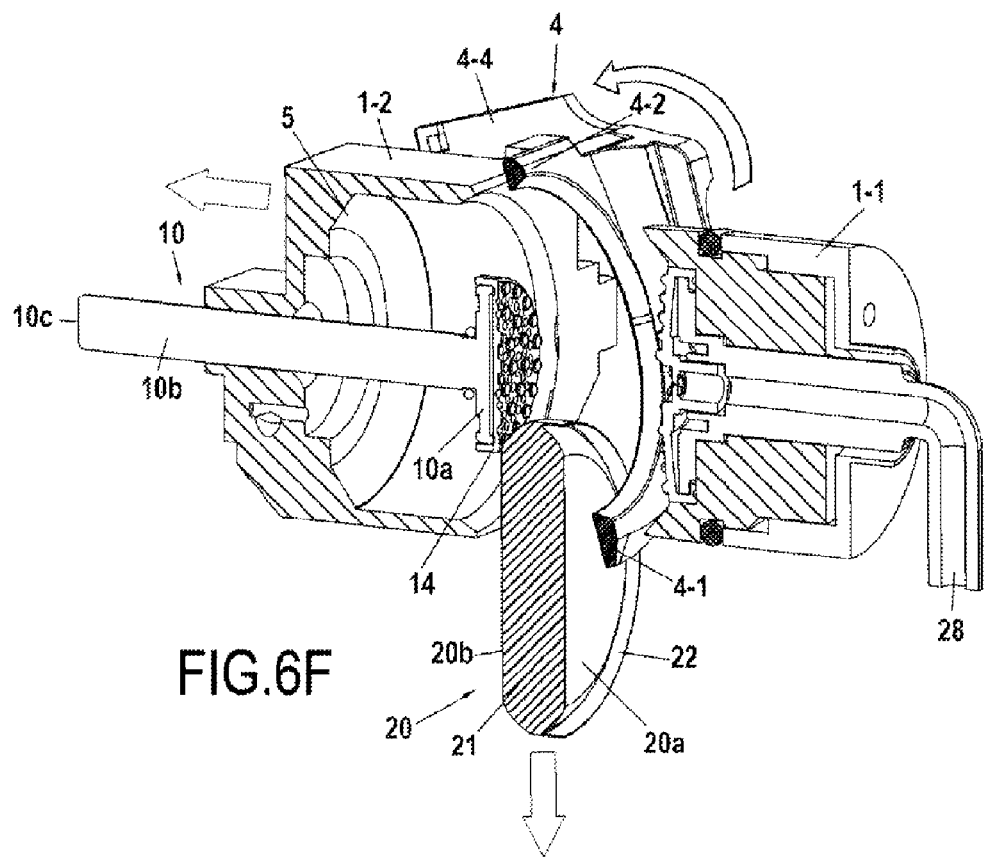

8—In FIGS. 6F, 7F1 and 7F2, the relative backward translation of the female part 1-2 relatively to the piston 1-1 was continued, so that the fingers 4-6 of the arms 4-4 of the cradle 4 arrive in the tilted portion 1-3*b*1 of the guiding groove 1-3*b* causing pivoting of the cradle as far as its maximum tilt. Concomitantly, the plate 14 of the ejector 10 arrives just in front of the front aperture 5-1 of the chamber 5, thereby positioning the pod 20 in the discharge compartment 7 delimited by the front face 2 of the piston 1-1 and the tilted rear face 4*c* of the cradle 4 in a maximum tilt position. The discharge compartment 7 has a Λ shape with a wider lower aperture D1 than the pod, allowing the pod to fall by gravity into the space D of maximum separation between the female part 1-2 and male part 1-1, as illustrated in FIGS. 6F and 7F2.

As shown in FIG. 7F2, the pod 20 is no longer supported, neither by the front face 2 of the piston 1-1 nor by the lower portion 4-1 of the cradle 4, because of the pivoting of said cradle and from the fact that the separation distance D1 between the rear face 4*c* of the lower portion 4-1 of the cradle and the peak 2-4 of the front face 2 of the piston 1-1 is greater than the thickness of the pod 20.

Both male 1-1 and female 1-2 parts and the cradle 4 are then found in a same position of maximum separation D as in the initial position of FIGS. 7A and 6A and the upper aperture D2 of the insertion compartment 6, i.e. the distance between the upper portion 4-2 of the cradle 4 and the peak 2-4 of the front face 2 of the piston 1-1, is greater than the thickness of the pod 20 so as to allow its insertion into the compartment 6, as illustrated in FIGS. 6A and 7A.

During the different translations upon opening and closing, the O-ring 3 is in a position with a circular section 3*a* in which there is no contact or friction with the cylindrical wall 5*a* of the chamber 5 during this displacement.

The ejector 10, and more particularly the second perforated plate 14, has two stop positions in translation, notably in a said "opening and insertion" position as illustrated in FIG. 1, and in a said "opening and discharge" position as illustrated in FIGS. 10-6 and 10-7.

The application of toothed pulleys or gears 9-2*a* and 9-2*b* in combination with the toothed belt 9-2*c* transmitting the rotary movement of the lever 9-1 in order to generate a rotary movement of the arms 9-3 and 9-5, essentially allows the axis of rotation 9-4 of the lever 9-1 to be moved to the highest point of the device in order to reduce the length and the displacement angle of the lever 9-1. The lever 9-1 is then more easily integrated on the top of the device.

The insertion of the pod 20 into the compartment 6 may be accomplished manually by falling by gravity or by means of an automatic system with a drawer, pusher or carousel.

A pod 20 will be made up from a cover in paper filter with a base weight from 12 to 50 g/m$^2$, filled with coffee, the weight of the pod being from 5 to 7 grams. The maximum diameter of the pod will be from 5 to 7 centimeters at the flange, optionally up to 5.5-8 centimeters at a gripping tab 23. The maximum width in the radial dimension of the flange 22 at the tab 23 will be from 0.5 to 1 centimeter. The thickness in the longitudinal axial direction perpendicular to the diametrical plane of the pod will be from 0.5 to 1 centimeter.

The invention claimed is:

1. A device for preparing an aromatized beverage (1) capable of extracting aromas by infusion of a powder pod (20) containing them, said pod comprising a pastille-shaped part full of said powder (21), having a flat or ovoid pastille shape, said device being capable of extracting the aromas contained in said powder when said pod is crossed by a liquid, being pressurized water, in an extraction chamber, said device comprising:
   a first part (1-1) and a second part (1-2) of a same longitudinal axis (XX'), and
   relative translation means (9) for coaxial horizontal (XX') relative translation of said first part (1-1) and second part (1-2) between:
      an initial opening position of maximum separation in relative translation of both first and second parts, between which is found a third part (4) delimiting an insertion compartment (6) capable of receiving said pod, the latter may be inserted by gravity into said insertion compartment, open in an upper portion of said insertion compartment,
      a closing position of minimum separation in relative translation of both first and second parts in which said first and second parts delimit a sealed compartment, called an extraction chamber, inside which, said pod is able to be compressed for producing an extraction, said third part comprising an orifice (4b), able to be crossed by at least one of both first and second parts, and a final opening position identical to said initial opening position of maximum separation in translation of both first and second parts, between which said third part delimits a discharge compartment (7) capable of receiving said pod after said extraction, said pod may be discharged by gravity out of said discharge compartment, open in a lower portion of said discharge compartment, wherein said third part is pivotally mounted relative to a transverse axis YY' perpendicular to said longitudinal axis XX', capable of pivoting in a synchronized way with said relative translation of both first and second parts, such that:

a plane (P) of said orifice (4b) is in a vertical position, and crossed by said first or second part when said first and second parts are in said closing position, and the plane (P) of said orifice (4b) is in a maximum tilted position (α), relative to a transverse vertical plane, perpendicular to said longitudinal axis (XX'), when said first and second parts are in said initial opening position, or in said final opening positions, and said third part has a cradle shape such that in a tilted position (α), in said initial and final opening positions, it forms:

said insertion compartment (6) with a front face of said first part (1-1), or said second part (1-2), and said discharge compartment (7) with a front face (2) of said second part (1-2) or, respectively, said first part (1-2), and said orifice (4b) of said third part comprises a front peripheral surface (4a) able to support, at least in a lower portion (4-1) of said front peripheral surface, one face (20b) of a convex peripheral portion (24) of the part full of powder (21) of said pod in a tilted position in said insertion compartment, another one face (20a) of the convex peripheral portion (24) of the part full of powder shape of said pod in a tilted position in said insertion compartment bearing against a lower portion of a front face of said first or, respectively, second part.

2. The device according to claim 1, wherein said third part (4) has an identical tilt (α) in the initial opening position of the pod and the final opening position of the pod, and the pivoting of said third part is accomplished automatically concomitantly with a relative translation displacement of said first and second part (1-1, 1-2), and the pivoting of said third part comprises a rotation step between the tilted position (α) in said initial opening position, and a vertical position in which the orifice (4b) of said third part is crossed by said first or second part after having been crossed by said pastille-shaped part full of powder (21) of said pod (20).

3. The device according to claim 1, for infusion of said pod comprising said pastille-shaped part full of powder surrounded by a peripheral flat flange (22) extending in an axial plane of said pod and capable of being folded relative to said axial plane, wherein said peripheral flat flange (22) is inserted between the lower portion (4-1) of said third part and the lower portion of the front face of said first part or, respectively, second part forming said insertion compartment.

4. The device according to claim 3, wherein said device comprises:

a—said first part (1-1) being a first male part comprising a cylindrical portion (1-1a) forming a piston, and b—said second part (1-2) being a second female part comprising a body delimiting an internal chamber (5) with a cylindrical wall (5a) of a same longitudinal axis (XX') as said piston, and c—said third part pivotally mounted on a common chassis (1-3) supporting said first male part, said second female part, and third part, or secured to one of both first and second parts (1-1, 1-2), and d—said relative translation means for coaxial horizontal relative translation (9) (XX') of said first male part (1-1) and second female part (1-2) capable of allowing said translation between:

i—said closing position in which said cylindrical portion (1-1a) of said first male part (1-1) is located inside said internal chamber (5) delimiting a sealed compartment forming said extraction chamber, inside said internal chamber (5), the orifice of said third part in said vertical position being crossed by at least said first part (1-1) in the said closing position, and ii—said maximum separation position in which:

a front face (2) of said first male part is at maximum separation from a front surface of an aperture (5-1) of said internal chamber (5) of said second female part, and said third part (4), in a tilted position, forms a cradle, said orifice (4b) of which is delimited on its upper face by a front peripheral surface (4a), said front peripheral surface (4a) of said cradle delimiting said insertion compartment with the front face (2) of said first male part (1-1), said orifice (4b) being delimited on its lower face by a rear surface (4c) of said cradle, delimiting said discharge compartment (7) with the front surface (5-1) of the aperture of said internal chamber (5) of said second female part, and said front peripheral surface (4a) of said cradle, at least in said lower portion (4-1), is able to support a face (20b) of the pod in a sub-face of the convex peripheral portion (24) of the pastille-shaped part full of powder (21) of said pod when the latter is inserted into said insertion compartment, the other face (20a) of the pod in the convex peripheral portion (24) of the pastille-shaped part full of powder (21) of said pod bearing against the front face (2) of the first male part when said pod is inserted into said insertion compartment, said peripheral flat flange (22) of the pod being able to be inserted into a space forming a slot (8) between the lower portion (4-1) of the front face of said cradle, and the lower portion of the front face (2) of said first male part when said pod is inserted into said insertion compartment.

5. The device according to claim 4, wherein said device comprises:

a—said first male part (1-1) which is fixed, and b—said second female part (1-2) able to be displaced in translation, and c—said third part pivotally mounted on said second female part (1-2), said aperture (5-1) of said internal chamber (5) of said second female part being below and in front of a pivot axis (Y1Y1) of said third part, said orifice (4b) of said third part being able to be crossed by said first male part, and located in front of said second female part in said closing position.

6. The device according to claim 4, wherein said cradle forms a ring, the orifice (4*b*) of which includes, in an upper portion (4-2), a semi-circular upper half-circumference including said front peripheral surface (4*a*) capable of continuously supporting an upper portion of said peripheral flat flange and said orifice (4*b*) includes, in a lower portion (4-1), a semi-circular lower half-circumference including said front peripheral surface (4*a*) capable of continuously supporting a sub-face of said part full of powder (21) of said pod on one of its faces when said cradle is in a tilted position in front of the aperture (5-1) of said internal chamber (5), said orifice being bordered on one portion of its height by two side edges (4-3) capable of laterally bordering said peripheral flat flange, and maintaining it coaxially with said longitudinal axis (XX'), both semi-circular upper (4-2) and lower (4-1) portions being connected together by vertical rectilinear portions (4-8) at said side edges (4-3).

7. The device according to claim 4, wherein said front face (2) of the first male part (1-1) comprises:
 a non-cylindrical peripheral axisymmetrical surface of revolution (2-1) about said longitudinal axis (XX'), and
 a central surface (2-3) with a circular circumference of said longitudinal axis (XX'), and
 an intermediate axisymmetrical surface of revolution (2-2) about said longitudinal axis (XX') surrounding said central surface, said intermediate axisymmetrical surface of revolution (2-2) having an increasing diameter from said central surface (2-3), and to said peripheral axisymmetrical surface of revolution (2-1), said peripheral axisymmetrical surface of revolution having a decreasing diameter from a rear end (2-5) of maximum circumference to a front end (2-4), said rear end (2-5) being closest to a cylindrical wall (5*a*) of said internal chamber (5) in said closing position than said front end, said front end (2-4) forming a front end of said front face (2) of the first male part (1-1), and
 in said closing position, said front face (2) of the first male part (1-1) delimits with the cylindrical wall (5*a*) of said internal chamber (5), a peripheral housing (2*a*) able to contain the peripheral flat flange (22) which is folded relative to the vertical axial plane perpendicular to said longitudinal axis (XX') of said pod, when said pod is in said extraction chamber.

8. The device according to claim 4, wherein said first male part (1-1) comprises:
 a recessed rear portion (1-1*a*) having a cylindrical peripheral external surface, and
 a front portion (1-1*b*) partly contained in a recess (1-1*d*) of said rear portion, said front portion (1-1*b*) comprising said front face (2), which is not contained in said recess (1-1*d*) of said recessed rear portion, and
 said recessed rear portion (1-1*a*) being connected and/or able to cooperate with said front portion (1-1*b*), through a first elastic element, and
 a deformable O-ring (3) inserted between said recessed rear portion (1-1*a*) and said front face (2) of said front portion (1-1*b*), producing the seal of said extraction chamber when a longitudinal compression is exerted against said front face (2) of the first male part by relative translation of said first male part (1-1) and second female part (1-2) in said closing position.

9. The device according to claim 4, wherein said second female part (1-2) comprises a second plate (14) within said internal chamber with a cylindrical wall (5*a*), said second plate having a form of a recessed housing (5*c*) at a bottom (5*b*) of said internal chamber, said second plate (14) being able to be moved in longitudinal relative translation relative to said internal chamber, between:
 i—the bottom (5*b*) of the internal chamber, and
 ii—a discharge position outside said internal chamber, just in front of the aperture (5-1) of said internal chamber, and
 the relative translation of said second plate is able to be synchronized with said relative translation means (9) of said first male part (1-1) and second female part (1-2) so that:
  i'—said second plate (14) may be positioned in the rear of said insertion compartment (6), in an initial opening position forming an initial insertion position, and then be moved towards the bottom (5*c*) of said internal chamber during a relative translation (9) for bringing said second female part closer to said first male part from said initial insertion position to said closing position, and
  ii'—said second plate (14) may be moved from the bottom of said internal chamber to the outside of said internal chamber, after relative translation for moving said second female part away from said first male part from said closing position to said discharge position.

10. The device according to claim 9, wherein said second female part (1-2) further comprises a supporting and ejection element (10) comprising a second plate (14) which is perforated and connected to a front of a rod (10*b*) crossing the bottom (5*b*) of the cylindrical internal chamber (5), said rod (10*b*) and said second plate (14) being able to be blocked in translation when said second female part (1-2) is moved in reverse translation from said closing position to said discharge position because a rear portion (10*c*) of said rod (10*b*) on the outside, at the rear of said female part, is blocked by an abutment (9-6) positioned behind said second female part.

11. The device according to claim 4, wherein said relative translation means (9) are able to move said second female part (1-2) relative to said first male part (1-1), said first male part being attached to a chassis (1-3), said chassis ensuring the guiding (1-3*a*) in coaxial longitudinal relative translation of the second female part relative to said first male part and the guiding in relative translation and rotation of said third part (4).

12. The device according to claim 11, wherein said third part (4) is guided in rotation by guiding elements (4-6) secured to said third part and moved along additional guiding elements (1-3*b*, 1-3*b*1, 1-3*b*2) forming a guide path being a non-entirely horizontal grooved path, including at least one portion (1-3*b*1) which does not extend in the axial horizontal direction of relative translation of said first and second parts, said additional guiding elements being secured to said chassis (1-3), and allowing the pivoting of said third part to be guided and controlled when said first and second parts are moved in relative translation.

13. The device according to claim 4, wherein said relative translation means comprise a system of connecting rods (9-3, 9-5) which may be manually actuated by a lever (9-1), or in a motor-driven way, said system of connecting rods ensuring a kinematic connection in translation of said second female part relative to said first male part.

14. A method for using a device according to claim 1, wherein the following successive steps are carried out:
 1—said pod, in a tilted position, is inserted by gravity into said insertion compartment (6), said first part (1-1) and second part (1-2) being in said initial opening position, one face (20*a*) of the pod in the convex peripheral portion (24) of the part full of powder (21) of said pod bearing upon the lower portion of the front peripheral surface (4a) of said third part, the other face (20a) of the pod in the convex,
peripheral portion (24) of the part full of powder (21) of said pod bearing against a lower portion of the front face of said first or second part, and then 2—relative translation is performed for bringing closer both said first part (1-1) and second part (1-2) followed by rotation, and then translation of said third part, from said initial opening position to said closing position in which the orifice of said third part in a vertical position is crossed by at least one of said first and second parts, and said pod (20) is compressed in said extraction chamber, and then 3—injection of liquid through said pod and discharge of said liquid from said extraction chamber are carried out, and 4—a relative translation is performed for moving away both said first part (1-1) and second part (1-2) from said closing position to said final opening position, said third part in a vertical position being displaced in translation and then, in rotation in said tilted position, said pod (20) being moved into said discharge compartment (7) in which the pod is discharged by gravity.

15. The method for use according to claim 14, for infusion of said pod comprising said pastille-shaped pod full of powder surrounded by a peripheral flat flange (22) extending in an axial plane of said pod and able to be folded relative to said axial plane, wherein the following successive steps are carried out:

1—said pod with its peripheral flat flange in a tilted position is inserted by gravity into said insertion compartment (6), said first part (1-1) and second part (1-2) being in said initial opening position, one face (20a) of the pod in the convex peripheral portion (24) of the pastille-shaped part full of powder (21) of said pod bearing upon a lower portion of the front peripheral surface (4a) of said third part, the other face (20a) of the pod in the convex peripheral portion (24) of the pastille-shaped part full of powder (21) of said pod bearing against a lower portion of the front face of the first part, said peripheral flat flange (22) of the pod being inserted into a space forming a slot (8) between the lower portion (4-1) of the front face of said third part and the lower portion of the front face (2) of said first part when said pod is inserted into said insertion compartment, and then 2—relative translation is performed for bringing closer both said first part (1-1) and second part (1-2), and rotation and then translation of said third part, from said insertion position to as far as said closing position in which the orifice of said third part in a vertical position is crossed by at least said first part (1-1), and crossed by said pastille-shaped part full of powder (21) of said pod and by said first part (1-1), and said pod (20) is flattened and compressed in said extraction chamber between the front face (2) of the first part (1-1) and a bottom of said extraction chamber, and then 3—injection of liquid through said pod and discharge of said liquid from said extraction chamber are carried out, and 4—a relative translation is performed for moving away both said first part (1-1) and second part (1-2) from said closing position to said final opening position, said third part in said vertical position being moved in translation towards a front aperture (5-1) of the extraction chamber, and then in rotation into said tilted position ($\alpha$), said pod (20) being moved from a bottom of said extraction chamber towards the front aperture of said extraction chamber into said discharge compartment (7) in which the pod is discharged by gravity.

16. The device according to claim 1, wherein said orifice of said third part is at least partly circular.

17. The device according to claim 1, wherein said tilted position is an angle ($\alpha$) from 10° to 30° relative to a transverse vertical plane perpendicular to said longitudinal axis (XX').

18. The device according to claim 4, wherein said front surface of said cradle is a frusto-conical surface at least in the lower portion (4-1), and said rear surface (4C) of said cradle is a planar surface.

\* \* \* \* \*